(12) United States Patent
Kresse et al.

(10) Patent No.: US 12,218,626 B2
(45) Date of Patent: Feb. 4, 2025

(54) MULTIPLE ACTUATOR SYSTEM FOR SOLAR TRACKER

(71) Applicant: Nextracker LLC, Fremont, CA (US)

(72) Inventors: David E. Kresse, Walnut Creek, CA (US); Samuel Heller, San Carlos, CA (US)

(73) Assignee: NEXTRACKER LLC, Fremont, CA (US)

( * ) Notice: Subject to any disclaimer, the term of this patent is extended or adjusted under 35 U.S.C. 154(b) by 8 days.

(21) Appl. No.: 18/196,301

(22) Filed: May 11, 2023

(65) Prior Publication Data

US 2023/0283226 A1    Sep. 7, 2023

Related U.S. Application Data

(63) Continuation of application No. 17/510,047, filed on Oct. 25, 2021, now Pat. No. 11,711,051, which is a
(Continued)

(51) Int. Cl.
*H02S 20/32* (2014.01)
*F16H 37/04* (2006.01)
(Continued)

(52) U.S. Cl.
CPC ............. *H02S 20/32* (2014.12); *F16H 37/04* (2013.01); *F16H 48/08* (2013.01); *F16H 57/038* (2013.01);
(Continued)

(58) Field of Classification Search
CPC .......... H02S 20/32; H02S 20/10; F16H 37/04; F16H 48/08; F16H 57/038;
(Continued)

(56) References Cited

U.S. PATENT DOCUMENTS

| 496,249 A | 4/1893 | Dunfee |
| 560,606 A | 5/1896 | Ward |

(Continued)

FOREIGN PATENT DOCUMENTS

| CN | 203423651 U | 2/2014 |
| CN | 104966748 A | 10/2015 |

(Continued)

OTHER PUBLICATIONS

PCT Search Report and Written Opinion issued in PCT/US19/23617 dated Jun. 18, 2019, 6 pages.
(Continued)

*Primary Examiner* — Devina Pillay
(74) *Attorney, Agent, or Firm* — Fredrikson & Byron, P.A.

(57) ABSTRACT

A solar tracking system is provided and includes a solar array, a support structure configured to support the solar array, a base configured to rotatably support the support structure, and an articulation system configured to articulate the support structure relative to the base. The articulation system includes a gearbox that is coupled to the support structure and an actuator that is configured to extend and retract. The actuator includes a first end portion and a second, opposite end portion, wherein the first end portion is rotatably coupled to the base and the second end portion is coupled to the gearbox. Extension of the actuator causes the support structure to rotate about the base in a first direction and retraction of the actuator causes the support structure to rotate about the based in a second, opposite direction.

17 Claims, 9 Drawing Sheets

Related U.S. Application Data continuation of application No. 16/124,773, filed on Sep. 7, 2018, now Pat. No. 11,159,120, which is a continuation of application No. 15/933,717, filed on Mar. 23, 2018, now Pat. No. 11,283,395.

(51) Int. Cl.
   *F16H 48/08* (2006.01)
   *F16H 57/038* (2012.01)
   *H02S 20/10* (2014.01)

(52) U.S. Cl.
   CPC ........ *H02S 20/10* (2014.12); *F16H 2037/049* (2013.01); *F16H 2048/082* (2013.01)

(58) Field of Classification Search
   CPC .......... F16H 2037/049; F16H 2048/082; F24S 2030/115; F24S 2030/134; F24S 2030/135; Y02E 10/47; Y02E 10/50
   See application file for complete search history.

(56) References Cited

U.S. PATENT DOCUMENTS

| | | |
|---|---|---|
| 576,478 A | 2/1897 | Smith |
| 586,737 A | 7/1897 | Guerne |
| 600,638 A | 3/1898 | Carrol |
| 601,491 A | 3/1898 | Altenbaugh |
| 613,243 A | 11/1898 | Carroll |
| 647,843 A | 4/1900 | Kellogg |
| 655,210 A | 8/1900 | Dupont |
| 687,839 A | 12/1901 | Kerr |
| 688,620 A | 12/1901 | Floerckey |
| 697,022 A | 4/1902 | Sammons |
| 792,342 A | 6/1905 | Nesselroad |
| 800,537 A | 9/1905 | Anatole et al. |
| 801,781 A | 10/1905 | Glisson |
| 801,914 A | 10/1905 | Rhoads |
| 803,040 A | 10/1905 | West |
| 808,066 A | 12/1905 | Borchers et al. |
| 815,303 A | 3/1906 | Mason |
| 815,308 A | 3/1906 | Perry |
| 4,063,543 A | 12/1977 | Hedger |
| 4,172,443 A | 10/1979 | Sommer |
| 4,875,726 A | 10/1989 | Thau |
| 4,936,611 A | 6/1990 | Sandor |
| 4,968,355 A | 11/1990 | Johnson |
| 4,984,389 A | 1/1991 | Benoit et al. |
| 5,000,495 A | 3/1991 | Wolfgang et al. |
| 5,067,605 A | 11/1991 | Gordon |
| 5,106,134 A | 4/1992 | Thau |
| 5,197,589 A | 3/1993 | Gordon |
| 5,317,145 A | 5/1994 | Corio |
| 5,512,742 A | 4/1996 | Mattson |
| 5,947,547 A | 9/1999 | Deeks et al. |
| 6,029,977 A | 2/2000 | Sym |
| 6,058,930 A | 5/2000 | Shingleton |
| 6,105,316 A | 8/2000 | Julius et al. |
| 6,260,893 B1 | 7/2001 | Wilson |
| 6,315,295 B1 | 11/2001 | Sym |
| 6,365,277 B1 | 4/2002 | Wilson |
| 6,454,974 B1 | 9/2002 | Wilson |
| 6,558,605 B1 | 5/2003 | Wilson |
| 6,563,040 B2 | 5/2003 | Hayden et al. |
| 6,586,088 B1 | 7/2003 | Wilson |
| 6,662,801 B2 | 12/2003 | Hayden et al. |
| 6,682,811 B1 | 1/2004 | Wilson |
| D496,248 S | 9/2004 | Liebendorfer |
| D496,249 S | 9/2004 | Liebendorfer |
| 6,872,432 B2 | 3/2005 | Wilson |
| 6,923,482 B2 | 8/2005 | Cumming et al. |
| 6,927,695 B2 | 8/2005 | Hayden |
| 6,932,204 B2 | 8/2005 | Dolan |
| 6,977,115 B1 | 12/2005 | Wilson |
| 6,988,305 B1 | 1/2006 | Wilson |
| 7,059,657 B2 | 6/2006 | Bodin et al. |
| 7,169,467 B2 | 1/2007 | Wilson |
| 7,170,025 B2 | 1/2007 | Martin Gonzalez |
| 7,172,238 B2 | 2/2007 | Bodin et al. |
| 7,252,083 B2 | 8/2007 | Hayden |
| 7,260,918 B2 | 8/2007 | Liebendorfer |
| D560,605 S | 1/2008 | Mcclintock et al. |
| D560,606 S | 1/2008 | Mcclintock et al. |
| 7,316,432 B2 | 1/2008 | Muskos |
| 7,316,446 B2 | 1/2008 | Wikstrom |
| 7,344,008 B1 | 3/2008 | Jonsson et al. |
| D565,505 S | 4/2008 | Shugar et al. |
| 7,357,132 B2 | 4/2008 | Hayden |
| 7,357,430 B2 | 4/2008 | Karlander |
| 7,413,226 B2 | 8/2008 | Muskos |
| D576,478 S | 9/2008 | Mead et al. |
| 7,434,362 B2 | 10/2008 | Liebendorfer |
| D586,737 S | 2/2009 | Shugar et al. |
| 7,531,741 B1 | 5/2009 | Melton et al. |
| 7,557,292 B2 | 7/2009 | Shingleton et al. |
| D600,638 S | 9/2009 | Plaisted et al. |
| D601,491 S | 10/2009 | Burtt |
| 7,600,349 B2 | 10/2009 | Liebendorfer |
| 7,611,175 B2 | 11/2009 | Tornberg |
| 7,631,924 B2 | 12/2009 | Nilsson |
| 7,647,924 B2 | 1/2010 | Hayden |
| D611,895 S | 3/2010 | Plaisted et al. |
| 7,678,208 B2 | 3/2010 | Bodin |
| D613,243 S | 4/2010 | Burtt |
| 7,721,492 B2 | 5/2010 | Plaisted et al. |
| 7,748,175 B2 | 7/2010 | Liebendorfer |
| 7,766,292 B2 | 8/2010 | Liebendorfer |
| 7,793,996 B2 | 9/2010 | Karlander |
| 7,793,997 B2 | 9/2010 | Karlander |
| 7,794,006 B2 | 9/2010 | Karlander |
| 7,836,879 B2 | 11/2010 | Mackamul |
| 7,856,769 B2 | 12/2010 | Plaisted et al. |
| 7,857,269 B2 | 12/2010 | Plaisted et al. |
| D630,576 S | 1/2011 | Plaisted et al. |
| 7,871,122 B2 | 1/2011 | Salomonsson |
| 7,874,601 B2 | 1/2011 | Tanskanen |
| 7,888,587 B2 | 2/2011 | Shingleton et al. |
| 7,900,407 B2 | 3/2011 | Plaisted |
| 7,905,526 B2 | 3/2011 | Asplund |
| 7,938,462 B2 | 5/2011 | Nilsson |
| 7,954,863 B2 | 6/2011 | Ahlin |
| 7,958,886 B2 | 6/2011 | Barsun et al. |
| 7,976,257 B2 | 7/2011 | Kufner |
| 8,023,266 B2 | 9/2011 | Russell et al. |
| D647,843 S | 11/2011 | Albritton et al. |
| D648,425 S | 11/2011 | Plaisted et al. |
| 8,052,100 B2 | 11/2011 | Zante et al. |
| 8,061,762 B2 | 11/2011 | Arvidsson et al. |
| 8,087,706 B2 | 1/2012 | Karlander et al. |
| 8,096,595 B2 | 1/2012 | Muskos |
| 8,096,596 B2 | 1/2012 | Steiner |
| 8,101,849 B2 | 1/2012 | Almy et al. |
| 8,123,265 B2 | 2/2012 | Nilsson |
| D655,210 S | 3/2012 | Narayanamurthy et al. |
| 8,128,044 B2 | 3/2012 | Liebendorfer |
| 8,156,697 B2 | 4/2012 | Miros et al. |
| 8,158,877 B2 | 4/2012 | Klein et al. |
| 8,177,180 B2 | 5/2012 | Plaisted et al. |
| 8,188,413 B2 | 5/2012 | Kats et al. |
| 8,188,415 B2 | 5/2012 | Kats et al. |
| 8,191,320 B2 | 6/2012 | Mittan et al. |
| 8,191,943 B2 | 6/2012 | Hellstrom |
| 8,203,110 B2 | 6/2012 | Silvestre Mata |
| 8,220,580 B2 | 7/2012 | Isaksson et al. |
| 8,230,850 B2 | 7/2012 | Barsun et al. |
| 8,234,821 B2 | 8/2012 | Plaisted et al. |
| 8,240,109 B2 | 8/2012 | Cusson et al. |
| 8,246,090 B2 | 8/2012 | Loveborn |
| 8,256,169 B2 | 9/2012 | Cusson et al. |
| 8,256,170 B2 | 9/2012 | Plaisted et al. |
| 8,266,848 B2 | 9/2012 | Miros et al. |
| 8,274,028 B2 | 9/2012 | Needham |
| 8,291,653 B2 | 10/2012 | Suarez et al. |
| 8,292,354 B2 | 10/2012 | Bodin et al. |

(56) References Cited

U.S. PATENT DOCUMENTS

| | | |
|---|---|---|
| 8,300,439 B2 | 10/2012 | Little et al. |
| 8,304,644 B2 | 11/2012 | Wares et al. |
| 8,316,590 B2 | 11/2012 | Cusson |
| 8,344,239 B2 | 1/2013 | Plaisted |
| 8,349,144 B2 | 1/2013 | Black et al. |
| 8,382,199 B2 | 2/2013 | Bodin |
| 8,383,943 B2 | 2/2013 | Little et al. |
| D677,619 S | 3/2013 | Truthseeker et al. |
| 8,397,448 B2 | 3/2013 | Brown et al. |
| 8,407,950 B2 | 4/2013 | Hartelius |
| 8,413,391 B2 | 4/2013 | Seery et al. |
| 8,434,230 B2 | 5/2013 | Bodin et al. |
| 8,453,328 B2 | 6/2013 | Kats et al. |
| 8,459,249 B2 | 6/2013 | Corio |
| 8,464,496 B2 | 6/2013 | Cusson et al. |
| 8,465,088 B2 | 6/2013 | Bodin et al. |
| D687,839 S | 8/2013 | Narayanamurthy |
| D688,620 S | 8/2013 | Burtt |
| 8,546,681 B2 | 10/2013 | Wares et al. |
| 8,567,134 B1 | 10/2013 | Grushkowitz et al. |
| 8,578,928 B2 | 11/2013 | Clavijo Lumbreras |
| 8,578,929 B2 | 11/2013 | Krabbe et al. |
| 8,604,404 B1 | 12/2013 | Linderman |
| 8,615,939 B2 | 12/2013 | Seery et al. |
| D697,022 S | 1/2014 | Truthseeker et al. |
| 8,640,400 B2 | 2/2014 | Liebendorfer |
| 8,641,539 B2 | 2/2014 | Paponneau |
| 8,650,812 B2 | 2/2014 | Cusson |
| 8,656,659 B2 | 2/2014 | Plaisted |
| 8,659,880 B2 | 2/2014 | Russell et al. |
| 8,660,708 B2 | 2/2014 | Narayanamurthy et al. |
| 8,665,610 B2 | 3/2014 | Kern |
| 8,671,930 B2 | 3/2014 | Liao |
| 8,684,449 B2 | 4/2014 | Bodin et al. |
| 8,704,080 B2 | 4/2014 | Conchy et al. |
| 8,712,745 B2 | 4/2014 | Wayne et al. |
| 8,720,431 B2 | 5/2014 | Kufner |
| 8,739,478 B1 | 6/2014 | Burtt et al. |
| 8,745,936 B2 | 6/2014 | Plaisted et al. |
| 8,754,627 B1 | 6/2014 | Le |
| 8,757,567 B2 | 6/2014 | Ciasulli et al. |
| 8,763,968 B2 | 7/2014 | Liebendorfer |
| 8,771,421 B2 | 7/2014 | Rathweg |
| 8,776,781 B2 | 7/2014 | Meydbray |
| 8,789,872 B2 | 7/2014 | Johansson |
| 8,790,451 B1 | 7/2014 | Narayanamurthy |
| 8,806,813 B2 | 8/2014 | Plaisted et al. |
| 8,807,129 B2 | 8/2014 | Mackamul |
| 8,807,839 B2 | 8/2014 | Jang |
| 8,816,870 B2 | 8/2014 | Plaisted et al. |
| 8,839,573 B2 | 9/2014 | Cusson et al. |
| 8,857,173 B2 | 10/2014 | Beale |
| 8,878,112 B2 | 11/2014 | Lee |
| 8,887,920 B2 | 11/2014 | Pelman et al. |
| 8,904,734 B2 | 12/2014 | Lucas et al. |
| 8,922,185 B2 | 12/2014 | Ehlmann et al. |
| 8,936,264 B2 | 1/2015 | Koormann et al. |
| 8,939,648 B2 | 1/2015 | Schneider et al. |
| 8,946,541 B2 | 2/2015 | Wares et al. |
| 8,946,542 B1 | 2/2015 | Truthseeker et al. |
| 8,946,608 B2 | 2/2015 | Sherman |
| 8,953,350 B2 | 2/2015 | Kern |
| 8,968,496 B2 | 3/2015 | Larsson et al. |
| 8,988,182 B2 | 3/2015 | Kern |
| 8,993,870 B2 | 3/2015 | Eom |
| 9,027,289 B1 | 5/2015 | Burtt |
| 9,035,168 B2 | 5/2015 | Barton |
| 9,038,329 B2 | 5/2015 | Pelman et al. |
| 9,057,542 B2 | 6/2015 | Schuit et al. |
| 9,090,138 B2 | 7/2015 | Haselhorst et al. |
| 9,103,563 B1 | 8/2015 | Burtt |
| 9,127,330 B2 | 9/2015 | Krispinsson |
| 9,140,403 B2 | 9/2015 | Blitz et al. |
| 9,145,906 B2 | 9/2015 | Schuit et al. |
| 9,160,273 B2 | 10/2015 | Schuit et al. |
| 9,166,525 B2 | 10/2015 | Grant |
| 9,168,801 B2 | 10/2015 | Dicke et al. |
| 9,170,031 B2 | 10/2015 | West et al. |
| 9,184,324 B2 | 11/2015 | Wares et al. |
| 9,188,366 B2 | 11/2015 | Thurner et al. |
| 9,205,726 B2 | 12/2015 | Arvidsson |
| 9,234,364 B2 | 1/2016 | Abad Huber et al. |
| 9,243,818 B2 | 1/2016 | Shugar et al. |
| 9,249,925 B2 | 2/2016 | Roensch et al. |
| 9,252,307 B2 | 2/2016 | Hartelius |
| 9,252,314 B2 | 2/2016 | Wares et al. |
| 9,254,800 B2 | 2/2016 | Nilsson |
| 9,279,415 B1 | 3/2016 | Huber et al. |
| 9,279,457 B2 | 3/2016 | Grushkowitz |
| 9,279,521 B2 | 3/2016 | Miyatake et al. |
| 9,281,419 B2 | 3/2016 | Klein et al. |
| 9,281,431 B2 | 3/2016 | Linderman |
| 9,281,778 B2 | 3/2016 | Corio et al. |
| 9,303,663 B2 | 4/2016 | Greenamyer et al. |
| 9,303,684 B2 | 4/2016 | Clavijo Lumbreras |
| 9,322,436 B2 | 4/2016 | Tokunaga et al. |
| 9,322,437 B2 | 4/2016 | Agullo |
| 9,342,087 B2 | 5/2016 | Chen et al. |
| 9,343,592 B2 | 5/2016 | Hunt |
| 9,352,941 B2 | 5/2016 | Wheeler et al. |
| 9,391,380 B2 | 7/2016 | Little et al. |
| 9,395,103 B2 | 7/2016 | Conley et al. |
| 9,397,606 B2 | 7/2016 | Liebendorfer |
| 9,413,287 B2 | 8/2016 | Hartelius |
| 9,452,724 B2 | 9/2016 | Nilsson |
| 9,453,660 B2 | 9/2016 | French et al. |
| 9,453,899 B2 | 9/2016 | Paponneau |
| 9,455,661 B2 | 9/2016 | Meydbray |
| 9,455,663 B1 | 9/2016 | Carrington |
| 9,462,734 B2 | 10/2016 | Swahn et al. |
| 9,477,247 B2 | 10/2016 | Ehlmann et al. |
| 9,482,449 B2 | 11/2016 | Cole et al. |
| 9,505,443 B2 | 11/2016 | Bodin |
| 9,581,678 B2 | 2/2017 | Corio |
| 9,584,062 B2 | 2/2017 | Ganshaw et al. |
| 9,593,867 B2 | 3/2017 | Seery et al. |
| 9,601,645 B2 | 3/2017 | Seery et al. |
| 9,610,910 B2 | 4/2017 | Muskos |
| 9,615,470 B2 | 4/2017 | Sherwood et al. |
| 9,631,840 B2 | 4/2017 | Corio |
| 9,641,123 B2 | 5/2017 | Swahn et al. |
| 9,654,052 B2 | 5/2017 | Paponneau |
| 9,655,292 B2 | 5/2017 | Swahn et al. |
| 9,657,967 B2 | 5/2017 | Adriani et al. |
| 9,687,898 B2 | 6/2017 | Loesch |
| D792,342 S | 7/2017 | Purigraski et al. |
| 9,743,501 B2 | 8/2017 | Ciasulli et al. |
| 9,744,997 B2 | 8/2017 | Olofsson et al. |
| 9,746,655 B2 | 8/2017 | Wares et al. |
| D799,420 S | 10/2017 | Purigraski et al. |
| D800,537 S | 10/2017 | Harris |
| D800,544 S | 10/2017 | Schuit et al. |
| 9,803,893 B2 | 10/2017 | Giraudo et al. |
| 9,806,669 B2 | 10/2017 | Michotte De Welle |
| D801,781 S | 11/2017 | Schuit et al. |
| D801,913 S | 11/2017 | Bauer et al. |
| D801,914 S | 11/2017 | Bauer et al. |
| D801,915 S | 11/2017 | Bauer et al. |
| D803,040 S | 11/2017 | Schuit et al. |
| 9,819,301 B2 | 11/2017 | Ripoll Agullo |
| 9,831,365 B2 | 11/2017 | Pelman et al. |
| 9,837,955 B1 | 12/2017 | Schuit et al. |
| D808,066 S | 1/2018 | Young |
| 9,927,150 B2 | 3/2018 | Eckl et al. |
| D815,303 S | 4/2018 | Schuit et al. |
| D815,308 S | 4/2018 | Schuit et al. |
| 9,937,846 B2 | 4/2018 | French et al. |
| 2004/0261334 A1 | 12/2004 | Liebendorfer et al. |
| 2005/0126621 A1 | 6/2005 | Dinwoodie et al. |
| 2007/0107767 A1 | 5/2007 | Hayden et al. |
| 2008/0185034 A1 | 8/2008 | Corio |
| 2008/0236570 A1 | 10/2008 | Kufner |
| 2008/0292424 A1 | 11/2008 | Kufner |
| 2009/0025708 A1 | 1/2009 | Shingleton |

(56) References Cited

U.S. PATENT DOCUMENTS

| | | |
|---|---|---|
| 2009/0134291 A1 | 5/2009 | Meier et al. |
| 2009/0232616 A1 | 9/2009 | Sekreta et al. |
| 2009/0260316 A1 | 10/2009 | Jones et al. |
| 2009/0320826 A1 | 12/2009 | Kufner |
| 2010/0059045 A1 | 3/2010 | Guinea Diaz et al. |
| 2010/0089390 A1 | 4/2010 | Miros et al. |
| 2010/0101559 A1 | 4/2010 | Grant et al. |
| 2010/0102201 A1 | 4/2010 | Sherman |
| 2010/0139741 A1 | 6/2010 | Wares |
| 2010/0179678 A1 | 7/2010 | Dinwoodie et al. |
| 2010/0193012 A1 | 8/2010 | Klammer et al. |
| 2010/0217724 A1 | 8/2010 | Wayne et al. |
| 2011/0044083 A1 | 2/2011 | Thompson |
| 2011/0108112 A1 | 5/2011 | Hong et al. |
| 2011/0138599 A1 | 6/2011 | Bellacicco et al. |
| 2011/0174295 A1 | 7/2011 | Clavijo Lumbreras |
| 2011/0220596 A1 | 9/2011 | Cusson et al. |
| 2011/0240007 A1 | 10/2011 | Currier |
| 2011/0272367 A1 | 11/2011 | Kufner |
| 2011/0272368 A1 | 11/2011 | Kufner |
| 2012/0027550 A1 | 2/2012 | Bellacicco et al. |
| 2012/0031030 A1 | 2/2012 | Cusson et al. |
| 2012/0031039 A1 | 2/2012 | Cusson et al. |
| 2012/0073565 A1 | 3/2012 | Grant et al. |
| 2012/0124922 A1 | 5/2012 | Cusson et al. |
| 2012/0125399 A1 | 5/2012 | Schatz et al. |
| 2012/0187058 A1 | 7/2012 | Almy et al. |
| 2012/0216852 A1 | 8/2012 | Almy et al. |
| 2012/0266938 A1 | 10/2012 | Goei et al. |
| 2012/0266940 A1 | 10/2012 | Grant et al. |
| 2013/0037081 A1 | 2/2013 | Grant |
| 2013/0037082 A1 | 2/2013 | Grant |
| 2013/0088329 A1 | 4/2013 | Chrysostom et al. |
| 2013/0098858 A1 | 4/2013 | Cusson et al. |
| 2013/0112239 A1 | 5/2013 | Liptac et al. |
| 2013/0269752 A1 | 10/2013 | Corio |
| 2013/0269753 A1 | 10/2013 | Corio |
| 2014/0000705 A1 | 1/2014 | Sounni et al. |
| 2014/0020734 A1 | 1/2014 | Baker et al. |
| 2014/0090638 A1 | 4/2014 | Grushkowitz |
| 2014/0140755 A1 | 5/2014 | Clavijo Lumbreras |
| 2014/0151312 A1 | 6/2014 | Cusson et al. |
| 2014/0174533 A1 | 6/2014 | Buller et al. |
| 2014/0263899 A1 | 9/2014 | Harris et al. |
| 2014/0270979 A1 | 9/2014 | Cusson et al. |
| 2014/0290716 A1 | 10/2014 | Stubbs |
| 2014/0318605 A1 | 10/2014 | Huzyak et al. |
| 2014/0338659 A1 | 11/2014 | Corio |
| 2014/0338722 A1 | 11/2014 | Feldman-Peabody et al. |
| 2014/0375132 A1 | 12/2014 | Agarwal et al. |
| 2015/0000725 A1 | 1/2015 | Reilly et al. |
| 2015/0040944 A1 | 2/2015 | Dinwoodie et al. |
| 2015/0090378 A1 | 4/2015 | Eriksson et al. |
| 2015/0101655 A1 | 4/2015 | Schuit et al. |
| 2015/0117067 A1 | 4/2015 | Naiknaware et al. |
| 2015/0121784 A1 | 5/2015 | Abad Huber et al. |
| 2015/0136205 A1 | 5/2015 | Worden |
| 2015/0144156 A1 | 5/2015 | French et al. |
| 2015/0165544 A1 | 6/2015 | Molina Mesa et al. |
| 2015/0171786 A1 | 6/2015 | Worden |
| 2015/0200619 A1 | 7/2015 | Worden |
| 2015/0203963 A1 | 7/2015 | Powell |
| 2015/0207452 A1 | 7/2015 | Werner et al. |
| 2015/0239061 A1 | 8/2015 | Hamlock et al. |
| 2015/0316639 A1 | 11/2015 | Russ et al. |
| 2015/0349706 A1 | 12/2015 | Grossman et al. |
| 2015/0355017 A1 | 12/2015 | Clarke et al. |
| 2015/0372636 A1 | 12/2015 | Menard |
| 2015/0377518 A1 | 12/2015 | Maxey et al. |
| 2015/0377520 A1 | 12/2015 | Kufner |
| 2016/0013751 A1 | 1/2016 | Michotte De Welle et al. |
| 2016/0028345 A1 | 1/2016 | Wares et al. |
| 2016/0044843 A1 | 2/2016 | Swahn et al. |
| 2016/0065121 A1 | 3/2016 | Bugg et al. |
| 2016/0065123 A1 | 3/2016 | Hayes et al. |
| 2016/0079907 A1 | 3/2016 | Russell et al. |
| 2016/0099572 A1 | 4/2016 | Gupta et al. |
| 2016/0102891 A1 | 4/2016 | Paponneau |
| 2016/0104084 A1 | 4/2016 | Philip et al. |
| 2016/0118933 A1 | 4/2016 | Russell et al. |
| 2016/0124067 A1 | 5/2016 | Paponneau |
| 2016/0140282 A1 | 5/2016 | Morse et al. |
| 2016/0140283 A1 | 5/2016 | Morse et al. |
| 2016/0190976 A1 | 6/2016 | Corio et al. |
| 2016/0190980 A1 | 6/2016 | Sun et al. |
| 2016/0195303 A1 | 7/2016 | Lambert et al. |
| 2016/0204733 A1 | 7/2016 | Agullo |
| 2016/0218662 A1 | 7/2016 | Deger et al. |
| 2016/0218663 A1 | 7/2016 | Werner et al. |
| 2016/0254673 A1 | 9/2016 | Batten et al. |
| 2016/0260848 A1 | 9/2016 | Schuh |
| 2016/0261225 A1 | 9/2016 | Paponneau |
| 2016/0261232 A1 | 9/2016 | Grushkowitz et al. |
| 2016/0285415 A1 | 9/2016 | Hunt |
| 2016/0301356 A1 | 10/2016 | Liebendorfer |
| 2016/0311665 A1 | 10/2016 | Wheeler et al. |
| 2016/0322827 A1 | 11/2016 | Gupta et al. |
| 2016/0322829 A1 | 11/2016 | Klein et al. |
| 2016/0329860 A1 | 11/2016 | Kalus et al. |
| 2016/0336900 A1 | 11/2016 | Paponneau et al. |
| 2016/0365823 A1 | 12/2016 | French et al. |
| 2016/0365830 A1 | 12/2016 | Burkhard et al. |
| 2016/0370033 A1 | 12/2016 | Mateille et al. |
| 2017/0005614 A1 | 1/2017 | Cole et al. |
| 2017/0012437 A1 | 1/2017 | Ehlmann et al. |
| 2017/0019060 A1 | 1/2017 | Dinwoodie et al. |
| 2017/0025989 A1 | 1/2017 | Shaw |
| 2017/0040928 A1 | 2/2017 | Schuit et al. |
| 2017/0040931 A1 | 2/2017 | Schuit et al. |
| 2017/0047885 A1 | 2/2017 | Swahn et al. |
| 2017/0050272 A1 | 2/2017 | Holmberg et al. |
| 2017/0054407 A1 | 2/2017 | Swahn et al. |
| 2017/0063288 A1 | 3/2017 | Schuit et al. |
| 2017/0066394 A1 | 3/2017 | Nilsson |
| 2017/0066481 A1 | 3/2017 | Bodin |
| 2017/0073911 A1 | 3/2017 | Holland et al. |
| 2017/0080523 A1 | 3/2017 | Andersson et al. |
| 2017/0102168 A1 | 4/2017 | Childress |
| 2017/0111006 A1 | 4/2017 | Vietas et al. |
| 2017/0126168 A1 | 5/2017 | Worden |
| 2017/0126169 A1 | 5/2017 | Worden |
| 2017/0133975 A1 | 5/2017 | Ganshaw et al. |
| 2017/0146264 A1 | 5/2017 | Ingram |
| 2017/0149373 A1 | 5/2017 | Aghatehrani et al. |
| 2017/0149375 A1 | 5/2017 | Burkhard et al. |
| 2017/0155356 A1 | 6/2017 | Schuit et al. |
| 2017/0159318 A1 | 6/2017 | Cusson et al. |
| 2017/0160372 A1 | 6/2017 | Corio |
| 2017/0163209 A1 | 6/2017 | Bailey et al. |
| 2017/0170777 A1 | 6/2017 | Dinwoodie et al. |
| 2017/0187192 A1 | 6/2017 | Jeanty et al. |
| 2017/0234580 A1 | 8/2017 | Worden |
| 2017/0237388 A1 | 8/2017 | Praca et al. |
| 2017/0252791 A1 | 9/2017 | Loesch |
| 2017/0257057 A1 | 9/2017 | Swahn et al. |
| 2017/0269919 A1 | 9/2017 | Cherukupalli et al. |
| 2017/0272029 A1 | 9/2017 | Liebendorfer |
| 2017/0279405 A1 | 9/2017 | Wares |
| 2017/0314819 A1 | 11/2017 | Adriani et al. |
| 2017/0331414 A1 | 11/2017 | Bailey et al. |
| 2017/0338768 A1 | 11/2017 | Prakash et al. |
| 2017/0353146 A1 | 12/2017 | Praca et al. |
| 2017/0359017 A1 | 12/2017 | Corio |
| 2017/0373632 A1 | 12/2017 | Bauer et al. |
| 2018/0013380 A1 | 1/2018 | Childress et al. |
| 2018/0029549 A1 | 2/2018 | Palo |
| 2018/0054066 A1 | 2/2018 | Ehlmann et al. |
| 2018/0062563 A1 | 3/2018 | Bapat et al. |
| 2018/0062564 A1 | 3/2018 | Grushkowitz et al. |
| 2018/0062565 A1 | 3/2018 | Schimelpfenig et al. |
| 2018/0062566 A1 | 3/2018 | Grushkowitz et al. |
| 2018/0062567 A1 | 3/2018 | Oh et al. |
| 2018/0062569 A1 | 3/2018 | Oh et al. |
| 2018/0073773 A1 | 3/2018 | Grushkowitz et al. |

(56) References Cited

U.S. PATENT DOCUMENTS

| | | | |
|---|---|---|---|
| 2018/0087908 A1 | 3/2018 | Bailey et al. | |
| 2018/0091087 A1 | 3/2018 | Bailey et al. | |
| 2018/0091088 A1 | 3/2018 | Barton et al. | |
| 2019/0052224 A1* | 2/2019 | Schatz | F24S 30/425 |

FOREIGN PATENT DOCUMENTS

| | | |
|---|---|---|
| CN | 104993002 A | 10/2015 |
| CN | 204810206 U | 11/2015 |
| CN | 204885197 U | 12/2015 |
| CN | 105242693 A | 1/2016 |
| CN | 204948015 U | 1/2016 |
| CN | 106410957 A | 2/2017 |
| CN | 106602989 A | 4/2017 |
| CN | 206117576 U | 4/2017 |
| CN | 206117579 U | 4/2017 |
| CN | 106656009 A | 5/2017 |
| CN | 106788180 A | 5/2017 |
| CN | 106788182 A | 5/2017 |
| CN | 206293452 U | 6/2017 |
| CN | 206294126 U | 6/2017 |
| CN | 206299691 U | 7/2017 |
| CN | 206299703 U | 7/2017 |
| CN | 206301216 U | 7/2017 |
| CN | 206302372 U | 7/2017 |
| CN | 107063448 A | 8/2017 |
| CN | 206370808 U | 8/2017 |
| CN | 206412976 U | 8/2017 |
| CN | 206472091 U | 9/2017 |
| CN | 206506474 U | 9/2017 |
| CN | 206506480 U | 9/2017 |
| CN | 107294482 A | 10/2017 |
| CN | 206575370 U | 10/2017 |
| CN | 107387579 A | 11/2017 |
| CN | 107425805 A | 12/2017 |
| CN | 107656549 A | 2/2018 |
| DE | 102016219989 A1 | 4/2018 |
| KR | 1020080031143 A | 4/2008 |
| KR | 2020080003349 U | 8/2008 |
| KR | 20120000106 U | 1/2012 |
| KR | 20120000107 U | 1/2012 |
| WO | 2015025065 A1 | 2/2015 |
| WO | 2016191779 A1 | 12/2016 |
| WO | 2017044566 A1 | 3/2017 |
| WO | 2017091471 A1 | 6/2017 |
| WO | 2017200917 A1 | 11/2017 |
| WO | 2017210265 A1 | 12/2017 |
| WO | 2018009634 A1 | 1/2018 |
| WO | 2018009642 A1 | 1/2018 |
| WO | 2018009650 A1 | 1/2018 |
| WO | 2018071332 A1 | 4/2018 |

OTHER PUBLICATIONS

"Axus Solar Tracker Data Sheet" available at http://www.axsussolar.com/#intro [retrieved on Sep. 12, 2018].
European Search Application No. EP23197651.5, Extended European Search Report mailed Dec. 14, 2023, 23 pages.
Notice of Acceptance issued in Australian Patent Application No. 2021236469 dated Apr. 11, 2023.
Examination Report No. 1 issued in Australian Patent application No. 2021236469 dated Sep. 21, 2022, 5 pages.

* cited by examiner

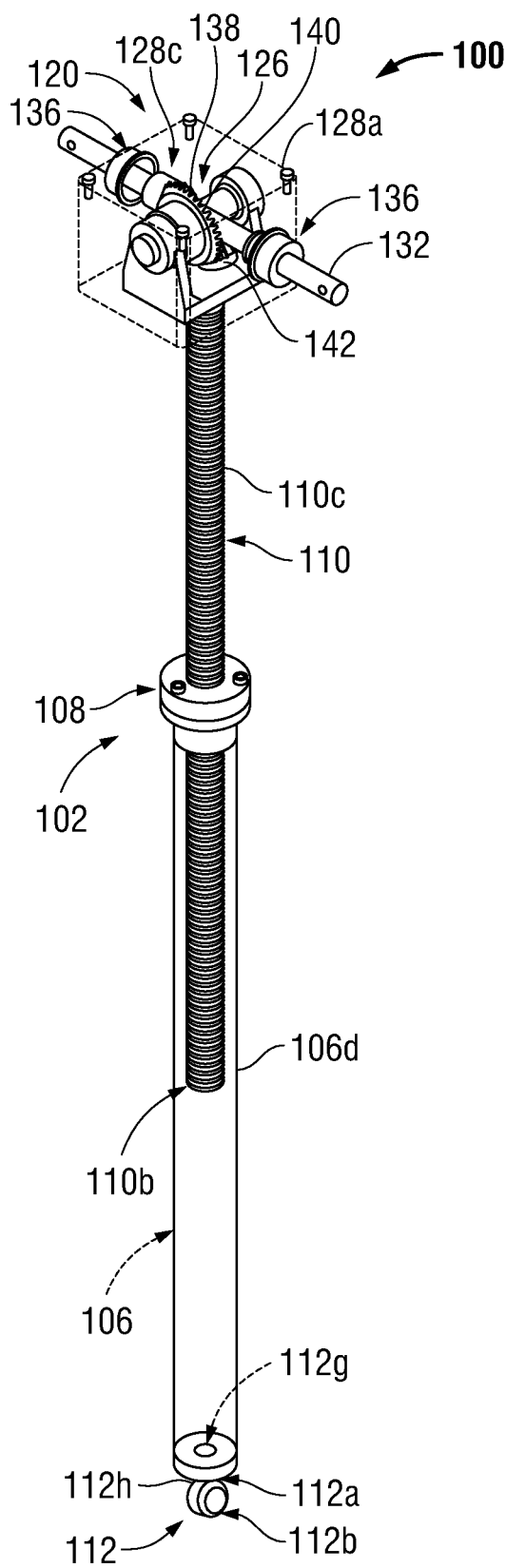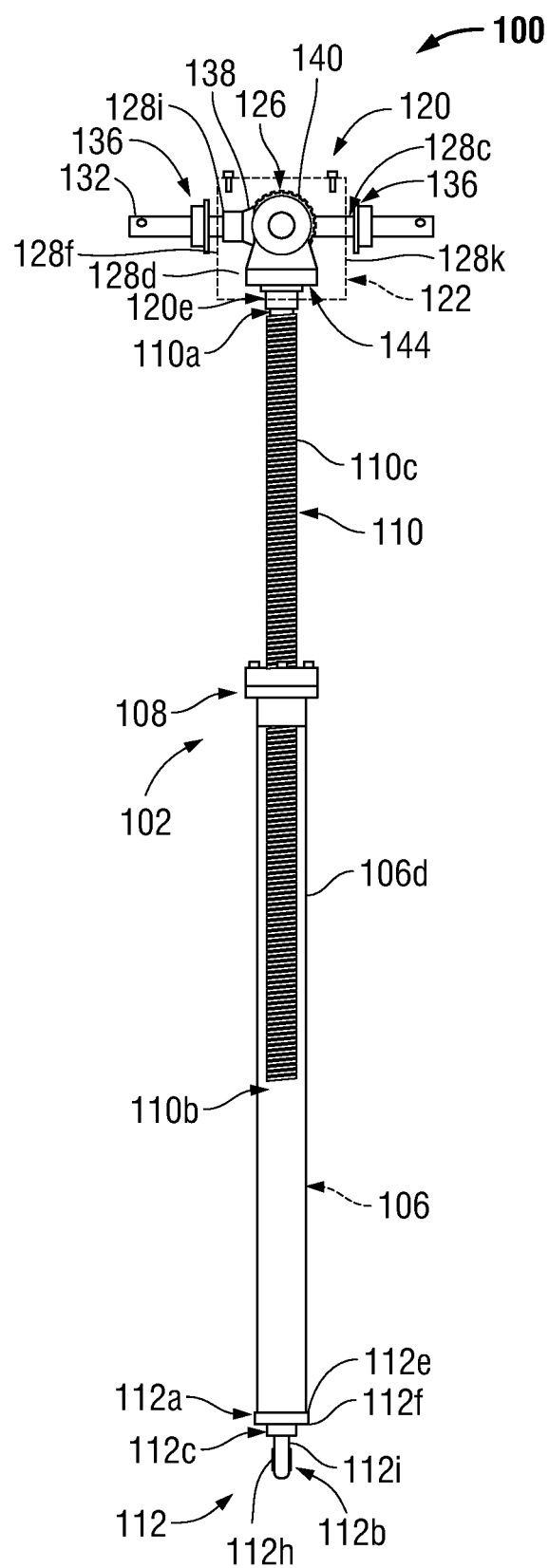
FIG. 10
FIG. 11

MULTIPLE ACTUATOR SYSTEM FOR SOLAR TRACKER

CROSS-REFERENCE TO RELATED APPLICATION

The present application is a continuation of U.S. patent application Ser. No. 17/510,047, filed on Oct. 25, 2021, which is a continuation of U.S. patent application Ser. No. 16/124,773, filed on Sep. 7, 2018, now U.S. Pat. No. 11,159,120, which is a continuation of U.S. patent application Ser. No. 15/933,717, filed on Mar. 23, 2018, now U.S. Pat. No. 11,283,395, the entire contents of each of which is incorporated by reference herein.

BACKGROUND

Technical Field

The present disclosure relates to solar power generation systems, and more particularly, to solar tracker actuating systems for adjusting the orientation of the solar power generation components to track the location of the sun.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

The present disclosure is directed to a solar tracking system including a solar array, a support structure configured to support the solar array, a base configured to rotatably support the support structure, and an articulation system configured to articulate the support structure relative to the base. The articulation system includes a gearbox coupled to the support structure and an actuator that is configured to extend and retract. The actuator includes a first end portion and a second, opposite end portion. The first end portion of the actuator is rotatably coupled to the base and the second end portion is coupled to the gearbox. Extension of the actuator causes the support structure to rotate about the base in a first direction and retraction of the actuator causes the support structure to rotate about the base in a second, opposite direction.

In aspects, the articulation system may include a motor that is mechanically coupled to the gearbox. Actuation of the motor causes the actuator to extend or retract.

In certain aspects, the solar tracking system may include a plurality of bases, each base rotatably supporting a portion of the support structure.

In other aspects, the solar tracking system may include a plurality of articulation systems corresponding to a respective base of the plurality of bases.

In certain aspects, the solar tracking system may include a plurality of driveshafts interconnecting the plurality of articulation systems such that rotation of the plurality of driveshafts causes a respective actuator associated with each articulation system of the plurality of articulation systems to extend or retract in unison.

In other aspects, the solar tracking system may include a motor that is mechanically coupled to the plurality of driveshafts. Actuation of the motor causes each driveshaft of the plurality of driveshafts to rotate, which in turn, causes each actuator of the plurality of articulation systems to extend or retract in unison.

In aspects, each articulation system of the plurality of articulation systems may include a motor that is mechanically coupled to each respective gearbox of the plurality of articulation systems, wherein each motor is configured to actuate a respective actuator of the plurality of articulation systems in unison.

In certain aspects, the gearbox may include an input shaft, a yoke rotatably supported by an outer casing of the gearbox, and an idler shaft. An outer surface of the idler shaft defines a transverse bore therethrough that is configured to receive the input shaft therein.

In aspects, the solar tracking system may include a pair of support bushings coupled to the support structure, wherein the support bushings are configured to rotatably support the input shaft of the gearbox. The pair of support bushings enables the gearbox to rotate about an axis defined by the input shaft but inhibit axial translation of the gearbox relative to the input shaft.

In other aspects, the second end portion of the actuator may be rotatably coupled to the yoke, wherein the yoke permits rotation of the actuator in a direction along the axis defined by the input shaft without causing a corresponding rotation of the gearbox.

In aspects, the gearbox may include an input gear fixedly coupled to the input shaft, an idler gear rotatably supported on the idler shaft, and a driven gear fixedly coupled to the second portion of the actuator, wherein rotation of the input gear causes a corresponding rotation of the idler gear, which in turn, causes rotation of the driven gear to cause the actuator to increase or decrease in length.

In certain aspects, the actuator may include a body portion, a nut coupled to the body portion, and a power screw threadably coupled to the nut, wherein rotation of the power screw relative to the nut cause the power screw to retract or advance within the body portion.

In other aspects, the support structure may be rotatably supported on the base at a geometric center of rotation of the support structure.

In certain aspects, the support structure may be rotatably supported on the base at a center of mass of the support structure and the solar array.

In accordance with another aspect with the present disclosure, a method of articulating a solar tracking system is provided and includes identifying a position of the sun relative to the solar array disposed in a support structure, the support structure rotatably supported by a plurality of bases, and changing a length of a plurality of actuators associated with the plurality of bases, wherein rotation of the solar array corrects the orientation of the solar array relative to the sun.

In aspects, changing the length of the plurality of actuators may include causing a motor mechanically coupled to a gearbox associated with the plurality of actuators to rotate, wherein rotation of the motor causes the gearbox to change the length of the plurality of actuators.

In other aspects, changing the length of the plurality of actuators may include causing a motor coupled to a plurality of driveshafts to cause a plurality of gearboxes associated with a respective actuator of the plurality of actuators to rotate, wherein rotation of the motor causes the plurality of driveshafts to rotate, which in turn, causes the plurality of gearboxes to change the length of the plurality of actuators.

In certain aspects, changing the length of the plurality of actuators may include causing a plurality of motors coupled to a respective plurality of gearboxes associated with the plurality of actuators to rotate, wherein rotation of the plurality of motors causes each respective gearbox to change the length of each respective actuator of the plurality of actuators.

In other aspects, the method may include accommodating thermal expansion of the plurality of driveshafts by permitting a yoke associated with the gearbox to rotate in a direction along an axis defined by the plurality of driveshafts.

In aspects, accommodating thermal expansion of the plurality of driveshafts may include the gearbox including an input shaft and an idler shaft, an outer surface of the idler shaft defining a transverse bore configured to receive a portion of the input shaft therethrough such that the yoke and idler shaft may rotate relative to the input shaft in the direction along the axis defined by the plurality of driveshafts.

BRIEF DESCRIPTION OF THE DRAWINGS

Various aspects and features of the present disclosure are described hereinbelow with reference to the drawings, wherein:

FIG. 10 is a perspective view of the actuator of FIG. 6 shown with an outer casing of a gearbox of the actuator of FIG. 6 in phantom;

FIG. 11 is a front view of the actuator of FIG. 6 shown with the outer casing of the gearbox of the actuator of FIG. 6 in phantom;

DETAILED DESCRIPTION

Figure 1:
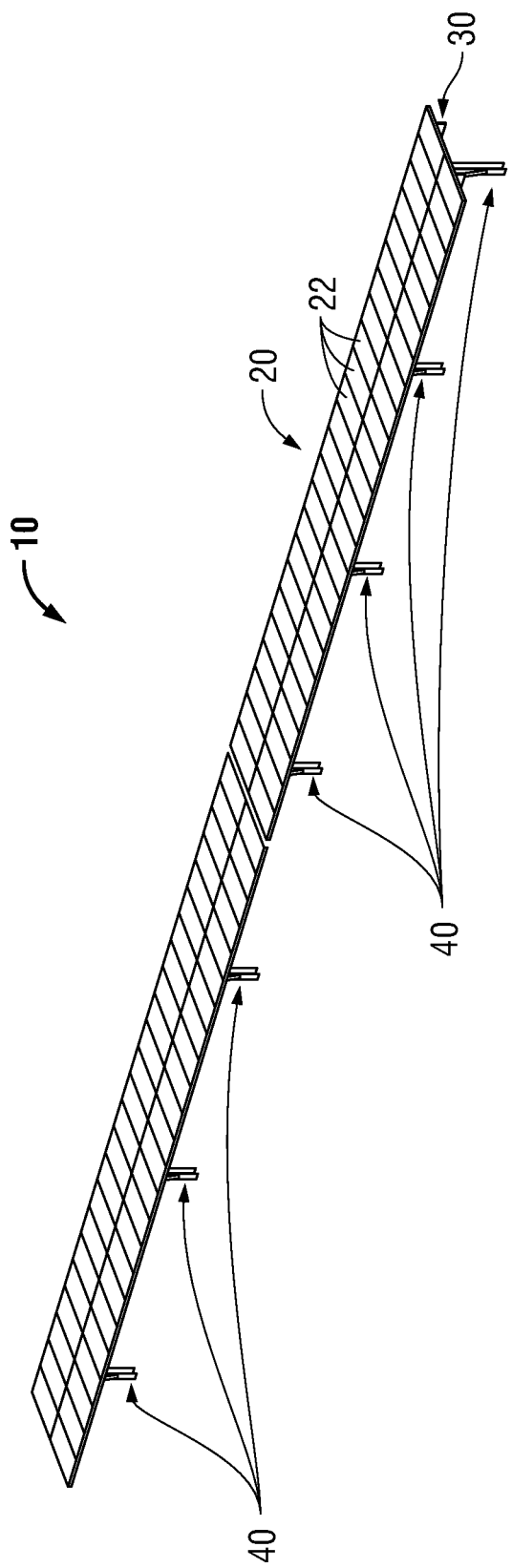
FIG. 1 is a top, perspective view of a solar tracking system provided in accordance with the present disclosure configured to articulate the angle of a solar array to track the location of the sun.
Figure 2:
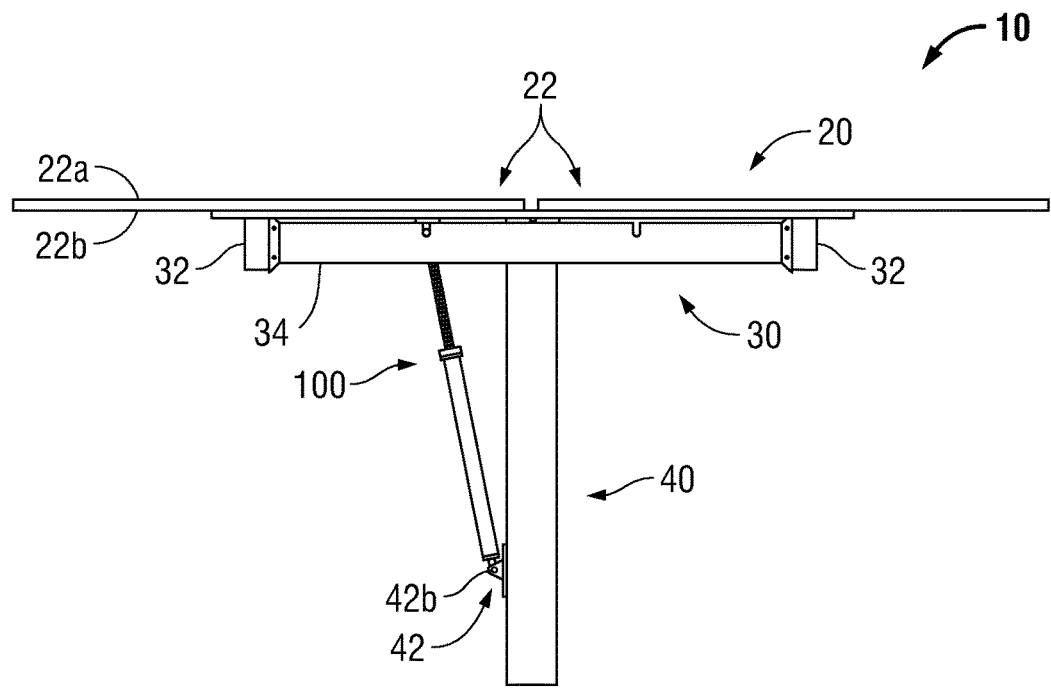
FIG. 2 is a side view of the solar tracking system of FIG. 1.

The present disclosure is directed to solar tracking systems and methods for articulating a solar tracking system. The solar tracking system includes a solar array that is supported by a support structure. The support structure, in turn, is rotatably supported by a plurality of bases that are configured to be anchored in the ground or to a stationary structure. An articulation system is coupled to the support structure and enables the selective rotation of the solar array about the base to track the location of the sun. The articulation system includes an actuator that is coupled to a gearbox, the actuator being rotatably coupled to the base and the gearbox being rotatably coupled to the support structure. The solar tracking system includes a plurality of articulation systems where each articulation system is associated with a respective base. As can be appreciated, using multiple actuators provides additional support to the solar array to reduce twist and reduce the size of components used in the solar tracking system.

The solar tracking system may include a single motor to drive the plurality of articulation systems or may include a plurality of motors associated with respective articulation system. Where only one motor is used, a plurality of driveshafts interconnects each gearbox such that the motor may drive each actuator simultaneously. To reduce windup and inhibit buckling of each driveshaft, one or more brackets are coupled to the support structure or solar array which supports the driveshafts at certain intervals. The plurality of driveshafts may be retained or removed where there is a plurality of motors employed by the solar tracking system. In this manner, each motor is electrically coupled to one another to ensure actuation of the plurality of articulation systems occurs in unison to inhibit twist of the support structure or solar array.

The gearbox includes an outer casing, an input shaft which is rotatably supported by the outer casing, a yoke which is rotatably supported by the outer casing in a transverse direction to the input shaft, and an idler shaft that is supported by the yoke. An outer surface of the idler shaft includes a transverse bore that is capable of receiving the input shaft therein. The actuator is rotatably supported at a first end by the base and the second end of the actuator is coupled to the yoke. Using this construction, the articulation system is able to accommodate thermal expansion of the support structure. Specifically, as the support structure expands and contracts, the location of the input shaft changes. To accommodate this change in location, the yoke is permitted to rotate in a direction along the driveshaft. The transverse bore includes an inner dimension that is large enough to accommodate ±10° of rotation by the actuator relative to the driveshafts. In this manner, the first portion of the actuator may remain stationary while the second portion of the actuator may be offset relative thereto, which helps inhibit any bind or stresses that may build up as a result of the thermal expansion of the driveshaft.

The support structure may be rotatably supported at either the geometric center of rotation or the center of mass of the support structure and solar array combined. Rotatably supporting the support structure at is geometric center of rotation introduces an unbalanced load as the support structure is rotated about the base. Specifically, the amount of torque required to articulate the support structure increases as the support structure is rotated from an angled position relative to the base to a horizontal position relative to the base. By rotatably supporting the support structure at the center of mass of the support structure and solar array combined, the torque required to rotate the support structure remains relatively constant through the range of motion of the solar tracking system. This reduces the energy required to articulate the support structure and may reduce the number of differing components, as the components no longer have to be designed for the unbalanced load.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

With reference to FIGS. 1-5, a solar tracking system capable of tracking the location of the sun provided in accordance with the present disclosure is illustrated and generally identified by reference numeral 10. The solar tracking system 10 includes a solar array 20, a support structure 30 that is configured to support the solar array 20, a base 40 that is configured to rotatably support the support structure 30, and an articulation system 100 (FIG. 2) that is configured to articulate the solar array 20 and support structure 30 relative to the base 40. The solar array 20 includes a plurality of photovoltaic modules 22, each of which is mechanically and electrically coupled to one another, although it is contemplated that each photovoltaic module 22 may be mechanically and/or electrically insulated from one another. In embodiments, the photovoltaic modules 22 may be any suitable photovoltaic module capable of generating electrical energy from sunlight, such as monocrystalline silicon, polycrystalline silicon, thin-film, etc. The photovoltaic modules 22 define an upper surface 22a and an opposite, bottom surface 22b. As can be appreciated, the upper surface 22a of the photovoltaic modules 22 includes the photovoltaic cells (not shown) while the bottom surface 22b includes any suitable means for fixedly or selectively coupling the photovoltaic modules 22 to the support structure 30, such as mechanical fasteners (e.g., bolts, nuts, etc.), adhesives, welding, etc., although it is envisioned that the photovoltaic modules 22 may be bi-facial photovoltaic modules, in which case the bottom surface 22b may also include photovoltaic cells such that energy may be captured from both the upper and bottom surfaces 22a, 22b.

In embodiments, the photovoltaic cells may be disposed within a suitable frame (not shown) which includes suitable means for fastening the photovoltaic modules 22 to the support structure 30. In this manner, the frame may include fastening means on a bottom surface thereof (not shown), or clamps or other suitable fasteners (e.g., Z-brackets, C-clamps, angle brackets, etc.) may be utilized to abut a portion of the frame and selectively or fixedly couple the frame to the support structure 30.

The support structure 30 includes a pair of parallel beams 32 (FIG. 3) disposed in spaced relation to one another and extending along a length of the solar tracking system 10. Although generally illustrated as being a C-channel, it is contemplated that the pair of parallel beams 32 may be any suitable beam capable of supporting the solar array 20, such as box beams, I-beams, H-beams, circular or round beams, etc. In embodiments, each beam of the pair of parallel beams 32 may include the same profile or may include different profiles, depending upon the installation needs of the solar tracking system 10.

Figure 3:
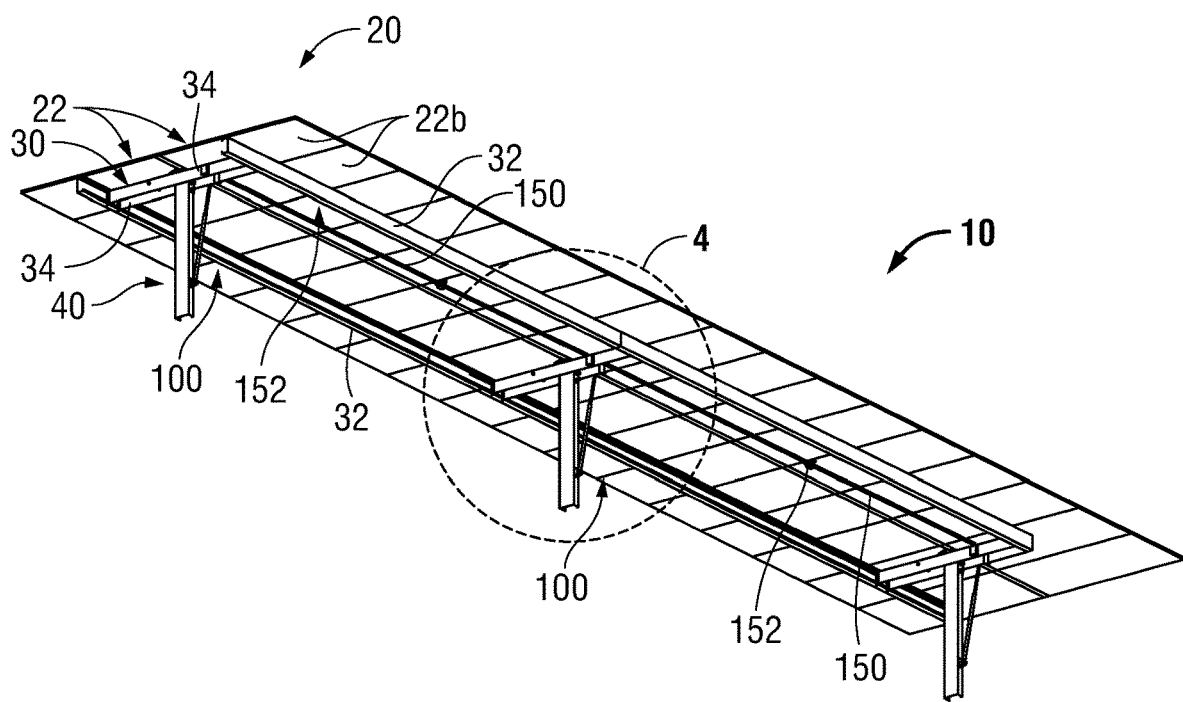
FIG. 3 is a bottom, perspective view of the solar tracking system of FIG. 1.
Figure 6:
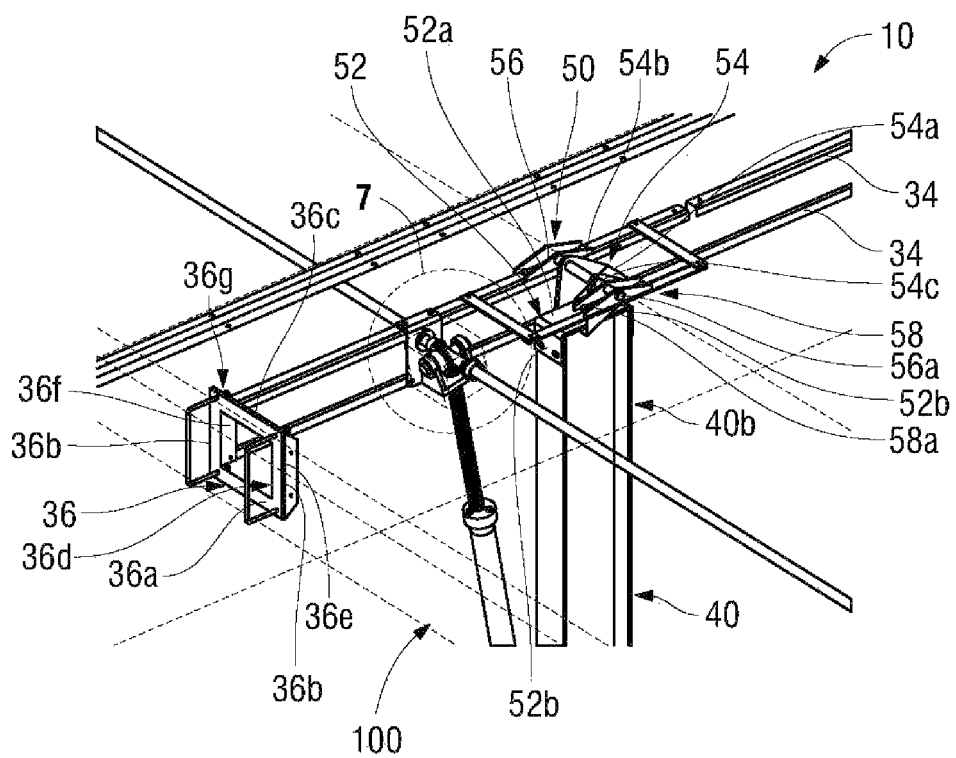
FIG. 6 is a top, perspective view of an actuator of the articulation system of FIG. 5 shown coupled to the solar tracking system of FIG. 1.

With additional reference to FIG. 6, the support structure 30 includes pairs of transverse beams 34 defining opposed ends 34a and 34b (FIG. 3). The pairs of transverse beams 34 are disposed parallel to one another and are spaced apart to receive a portion of the base 40, such that the support structure 30 may articulate without the base 40 interfering with articulation of the support structure 30 relative thereto, as will be described in further detail hereinbelow. Although generally illustrated as being a C-channel, it is contemplated that the pair of transverse beams 34 may be any suitable beam capable of supporting the solar array 20, such as box beams, I-beams, H-beams, etc. In embodiments, each beam of the pairs of transverse beams 34 may include the same profile or may include different profiles, depending upon the installation needs of the solar tracking system 10.

Each end of the opposed ends 34a, 34b of the pairs of transverse beams 34 is coupled to a respective beam of the pair of parallel beams 32. In this manner, an end cap 36 is disposed adjacent to each end 34a or 34b of each beam of the pair of transverse beams 34. The end cap 36 defines a generally planar surface 36a extending between opposed side surfaces 36b and top and bottom surfaces 36c. Although generally illustrated as having rectangular outer profile, other suitable profiles are contemplated, such as square, hexagonal, circular, oval, etc. The planar surface 36a defines a bore 36d therethrough. Although generally illustrated as having a profile corresponding to the outer profile of the planar surface 36a, it is contemplated that the profile of the bore 36d may be any suitable profile, such as square, hexagonal, circular, oval, etc. and may be different than the profile of the planar surface 36a. The planar surface 36a defines a first pair of flanges 36e disposed adjacent the opposed side surfaces 36b and extending between the top and bottom surfaces 36c (FIG. 6). The planar surface 36a defines a second pair of flanges 36f disposed adjacent the bore 36d and oriented parallel to the first pair of flanges 36e such that a channel 36g is defined between each of the first and second pairs of flanges 36e, 36f. The channels 36g are configured to receive a corresponding end 34a, 34b of each beam of the pair of transverse beams 34 such that the pair of transverse beams 34 may be coupled to the first and second pair of flanges 36e, 36f using any suitable means, such as mechanical fasteners, adhesives, welding, or the like.

Although illustrated as having a distance between the top and bottom surfaces 36c that is greater than the height of the pair of parallel beams 32, it is contemplated that the cap 36 may have a distance between the top and bottom surfaces 36c that is the same as or less than the height of the pair of parallel beams 32. With continued reference to FIG. 6, the cap 36 is fixedly or selectively coupled to each respective beam of the pair of parallel beams using any suitable means, such as mechanical fasteners, adhesives, welding, etc.

Figure 4:
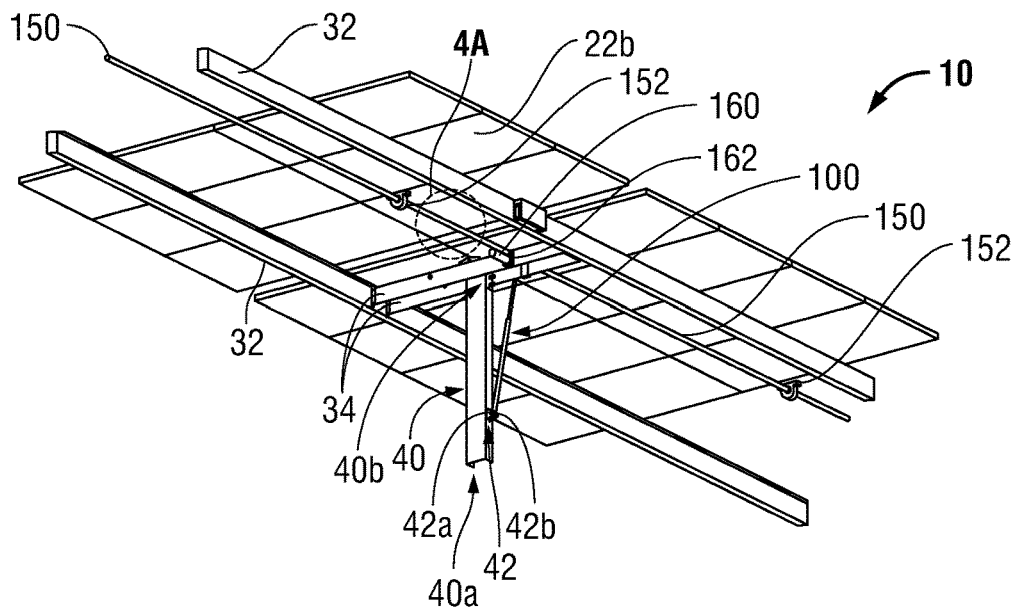
FIG. 4 is an enlarged view of the area of detail indicated in FIG. 3.

With reference to FIGS. 4 and 6, the base 40 defines a generally C-shaped profile, although it is contemplated that the base may be any suitable beam capable of supporting the solar array 20 and the support structure 30, such as box beams, I-beams, H-beams, etc. The base 40 extends between a first end portion 40a configured to be anchored in the ground and an opposite, second end portion 40b configured to rotatably support the support structure 30. In this manner, a pivot assembly 50 (FIG. 6) is coupled to the second end portion 40a and includes a support 52, a pivot 54, a pivot pin 56, and a pair of brackets 58. The support 52 defines a generally C-shaped profile defining a planar portion 52a and a pair of opposed flanges 52b disposed on opposing end portions thereof. The pair of opposed flanges 52b is spaced apart such that the second end portion 40a of the base 40 is interposed therebetween and the planar portion 52a abuts the second end portion 40a, although it is contemplated that planar portion 52a of the support 52 may be spaced apart from the second end portion 40a of the base. The pair of opposed flanges 52b is fixedly or selectively coupled to the second end portion 40a using any suitable means, such as mechanical fasteners, adhesives, welding, etc. An actuator mounting flange 42 (FIG. 4) is disposed on an outer surface of the base 40 adjacent to the first end portion 40a. It is contemplated that the actuator mounting flange 42 may be fixedly or selectively coupled to the base 40 using any suitable means, such as mechanical fasteners, adhesives, welding, etc. Although generally illustrated as defining a generally C-shaped profile, it is contemplated that the actuator mounting flange 42 may define any suitable profile, such as square, rectangular, etc. In this manner, the actuator mounting flange 42 defines a pair of opposed flanges 42a extending from a planar surface that is coupled to the outer surface of the base 40. In embodiments, the actuator mounting flange 42 may include a pair of independent flanges 42a that are individually coupled to the outer surface of the base 40. The pair of opposed flanges 42a defines a bore 42b therethrough that is configured to enable a pin (not shown) or other suitable means for rotatably coupling a portion of the articulation system 100 thereto when a portion of the articulation system 100 is interposed between the pair of opposed flanges 42a.

The pivot 54 defines a generally C-shaped profile having a planar portion 54a and a pair of opposed flanges 54b extending therefrom. Although generally illustrated as having a triangular profile, it is contemplated that the pair of opposed flanges 54b may include any suitable profile such as square, rectangular, oval, etc. In embodiments, each flange of the pair of opposed flanges 54b may have the same profile or a different profile. The pair of opposed flanges 54b define a corresponding pair of through-holes 54c therethrough that are configured to receive the pivot pin 56 therein.

As illustrated in FIG. 6, when the pivot pin 56 is received within the pair of opposed flanges 54b, the pivot pin 56 extends beyond each flange of the pair of opposed flanges 54b to engage a respective bracket of the pair of brackets 58. The pivot pin 56 defines a generally cylindrical profile extending between opposed end surfaces 56a. Each end surface of the opposed end surfaces 56a defines a relief (not shown) therein and extending toward one another. In this manner, the opposed end surfaces 56a define a generally D-shaped profile, although any suitable profile that is capable of inhibiting rotation of the pivot pin 56 relative to the pair of brackets 58 is contemplated, such as hexalobe, oval, square, rectangular, etc.

The pair of brackets 58 defines a generally C-shaped profile having a planar portion 58a and a pair of opposed flanges 58b extending therefrom. Although generally illustrated as having a triangular profile, it is contemplated that the pair of opposed flanges 58b may include any suitable profile, such as square, rectangular, oval, etc. In embodiments, each flange of the pair of opposed flanges 58b may have the same profile or a different profile. The pair of opposed flanges defines a corresponding pair of through-bores (not shown) therethrough that are configured to fixedly receive the pivot pin 56 therein. In this manner, each through-hole of the pair of through-holes defines a profile that is complementary to that of the profile of each corresponding end surface of the opposed end surfaces 56a of the pivot pin. As can be appreciated, the matching profiles of the through-holes and the opposed end surfaces 56a ensure that each bracket of the pair of brackets 58 remains aligned with one another to minimize or eliminate twisting of the support structure 30 (e.g., torque applied to one end surface is transferred through the pivot pin 56 to the opposite end surface of the opposed end surfaces 56a. In embodiments, the pivot pin 56 may not include a D-shaped profile an can be coupled to the pair of brackets 58 by friction fit, staking, adhesives, mechanical fasteners, welding, etc. The planar portion 58a is configured to be fixedly or selectively coupled to a corresponding beam of the pairs of transverse beams 34 to rotatably couple the support structure 30 to the base 40.

Figure 7:
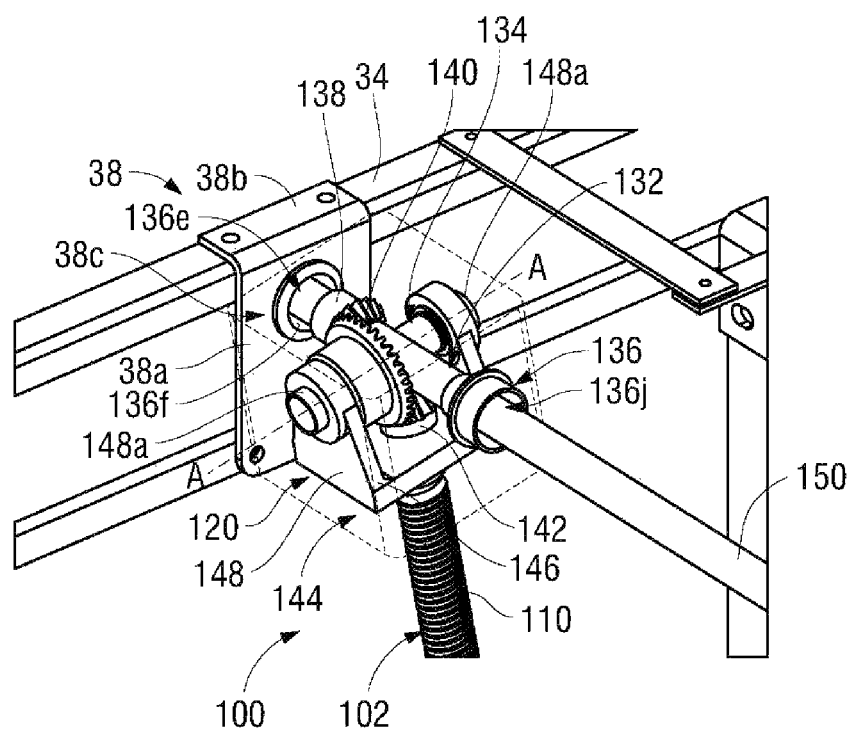
FIG. 7 is an enlarged view of the area of detail indicated in FIG. 6.
Figure 8:
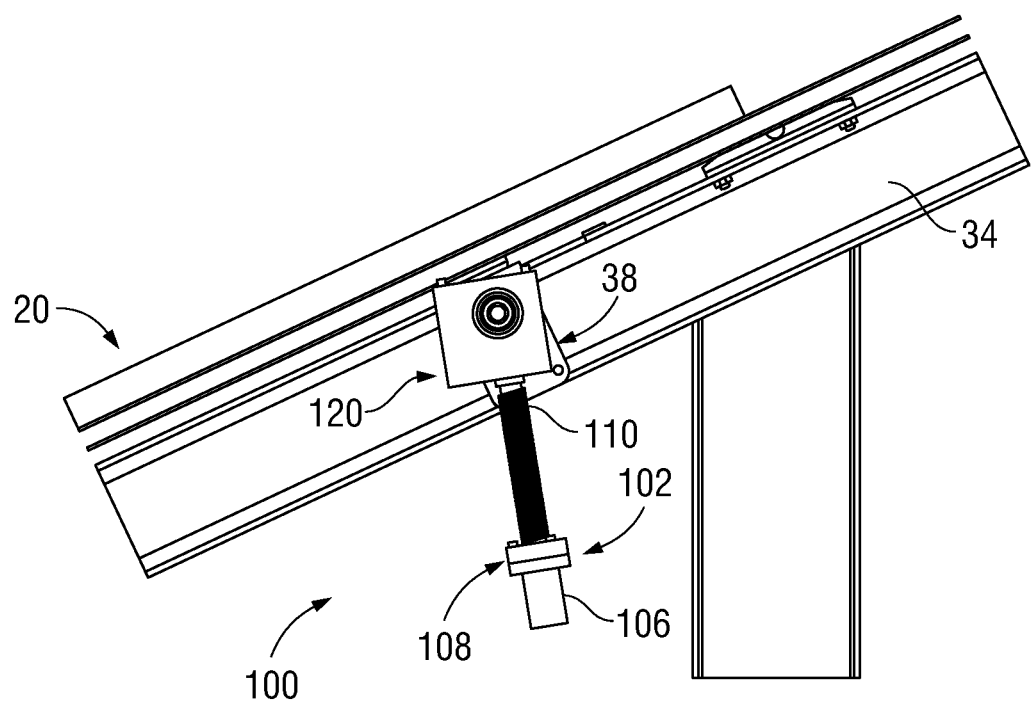
FIG. 8 is a side view of the actuator of FIG. 6 shown coupled to the solar tracking system of FIG. 1.

With additional reference to FIG. 7, the support structure 30 includes a pair of shear plates 38 having a generally L-shaped profile, although other suitable profiles are contemplated, such as C-shaped, etc. In this manner, each shear plate 38 includes a generally planar portion 38a and a flange 38b disposed at an end portion thereof and extending perpendicular therefrom. As can be appreciated, the flange 38b is configured to abut an upper portion of a corresponding beam of the pairs of transverse beams 34. The planar portion 38a defines a hole 38c therethrough that is configured to receive a bearing or bushing of the articulation system 100, as will be described in further detail below. As illustrated in FIG. 7, the pair of shear plates 38 is disposed in opposed relation to one another on a respective beam of the pairs of transverse beams 34.

Turning now to FIGS. 7-14, the articulation system 100 is illustrated and includes an actuator 102 and a gearbox 120. The actuator 102 includes a tubular body 106, a nut 108, a power screw 110, and a heim joint assembly 112. The tubular body 106 of the actuator 102 extends between opposed end surfaces 106a and 106b. Although generally illustrated as having a cylindrical profile, it is contemplated that the tubular body 106 may include any suitable profile, such as square, rectangular, oval, hexagonal, etc. The opposed end surfaces 106a, 106b define a through-hole 106c therethrough that is configured to receive the nut 108 adjacent the end surface 106a and a heim joint assembly 112 adjacent the end surface 106b. The nut 108 (FIG. 14) includes a washer 108a and a body portion 108b. The washer 108a defines a generally planar configuration having a generally circular profile corresponding to the profile of the tubular body 106. As can be appreciated, the washer 108a may include any suitable profile and may include the same or different profile than the tubular body 106. The washer 108a defines a through-hole 108c therethrough that is configured to receive a portion of the body portion 108b therethrough. The washer 108a is coupled to the end surface 106a of the tubular body 106 using any suitable means, such as mechanical fasteners, friction fit, adhesives, welding, etc.

The body portion 108b of the nut 108 defines a generally cylindrical profile having an outer diameter generally the same as an outer diameter of the tubular body 106, although other suitable configurations are contemplated. The body portion 108b extends between opposed end surfaces 108d and 108e. The end surface 108e defines an annular relief 108f therein extending towards the end surface 108d and through an outer surface 108g of the nut 108. The annular relief 108f terminates in a face 108g oriented opposite to the end surface 108d and is configured to abut a portion of the washer 108a. Although illustrated as being selectively coupled to the washer 108a using mechanical fasteners (i.e., bolts, screws, etc.), it is contemplated that the body portion 108b of the nut 108 may be selectively coupled to the washer 108a using any suitable means, and in embodiments, may be fixedly coupled to the washer 108a using any suitable means, such as adhesives, friction fit, welding, etc. The opposed end surfaces 108d, 108e of the body portion 108b define a threaded bore 108h therethrough that is configured to threadably engage the power screw 110, such that the power screw 110 can translate therewithin when rotated in a first or second direction relative to the nut 108, as will be described in further detail hereinbelow.

Figure 9:
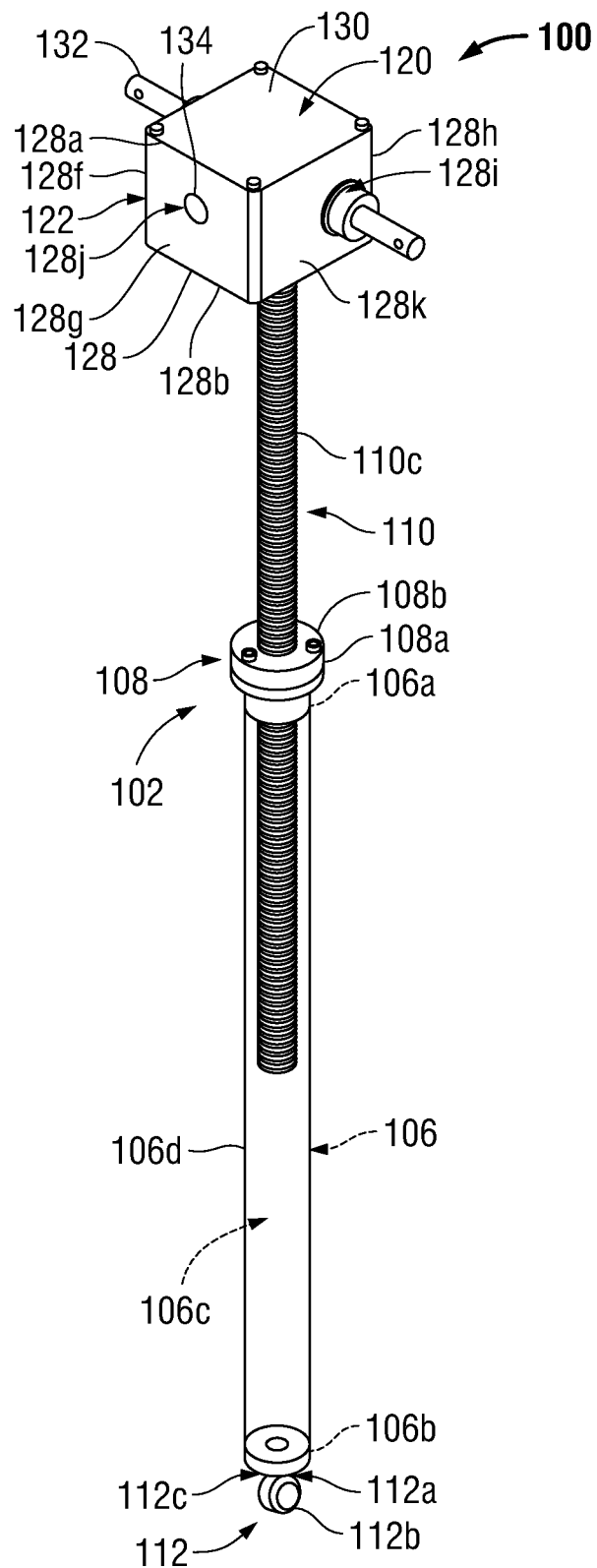
FIG. 9 is a perspective view of the actuator of FIG. 6.
Figure 12:
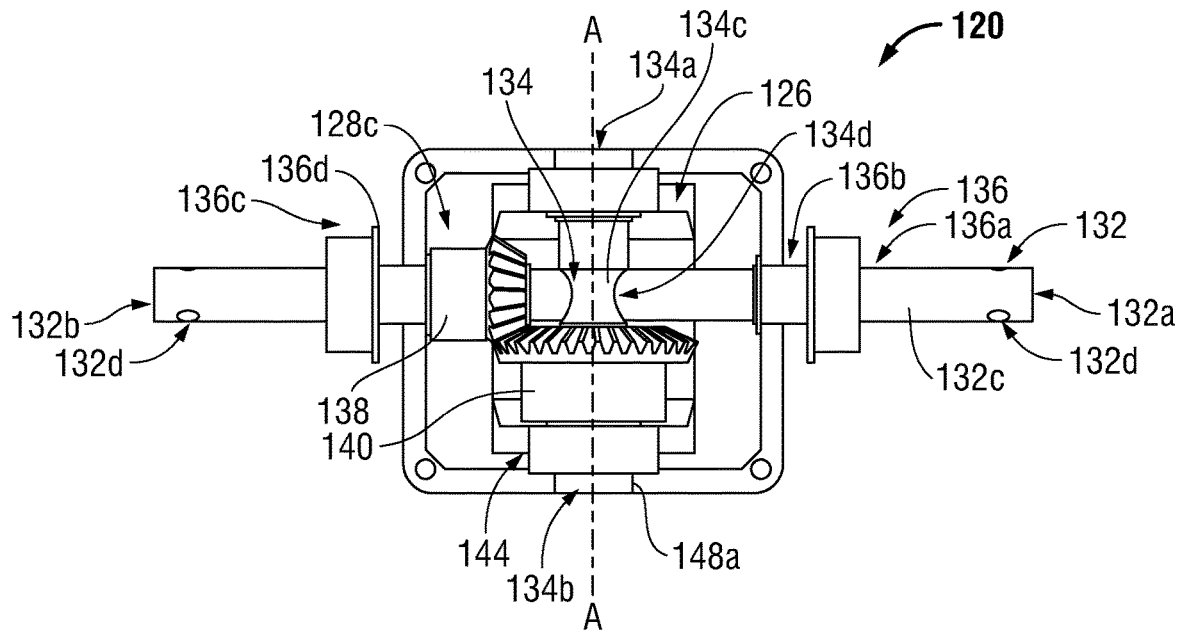
FIG. 12 is a top view of the actuator of FIG. 6 shown with the outer casing of the gearbox of the actuator of FIG. 6 in phantom.
Figure 13:
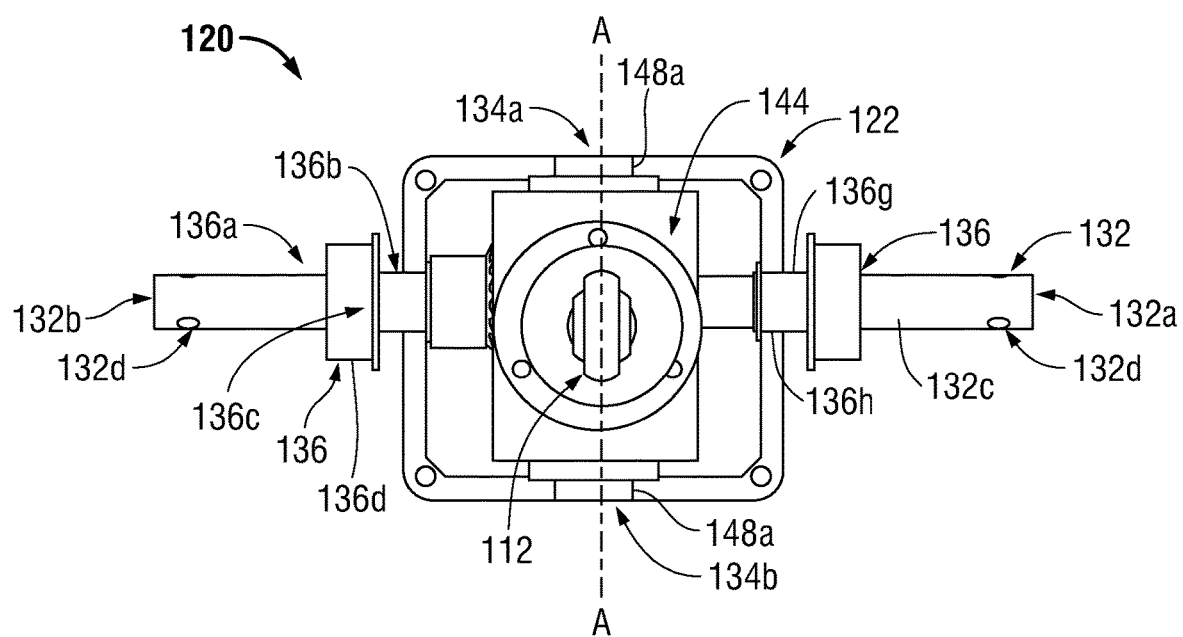
FIG. 13 is a bottom view of the actuator of FIG. 6 shown with the outer casing of the gearbox of the actuator of FIG. 6 in phantom.
Figure 14:
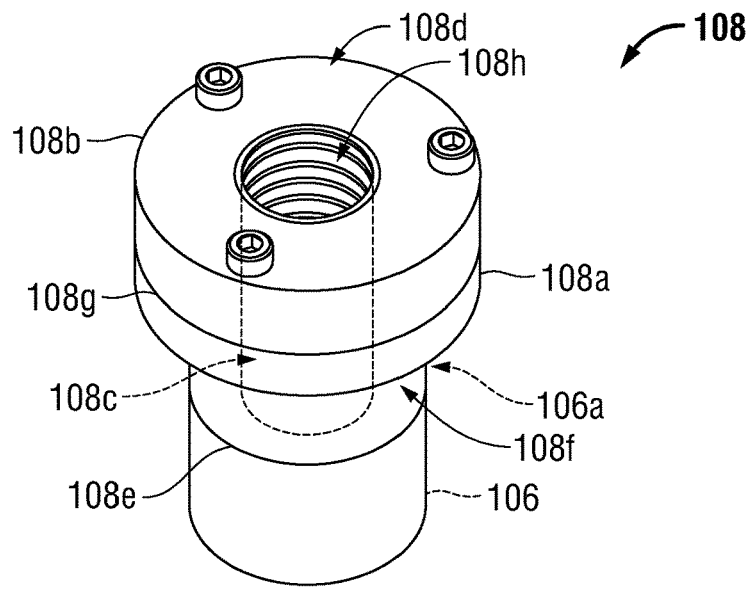
FIG. 14 is a perspective view of a nut of the actuator of FIG. 6.

With reference to FIGS. 9-11, the heim joint assembly 112 includes a heim joint washer 112a, a heim joint 112b, and a heim joint nut 112c. The heim joint washer 112a extends between opposed end surfaces 112e and 112f and defines a generally cylindrical profile that is complimentary to the profile of the tubular body 106, although it is contemplated that the profile of the heim joint washer 112a may include any suitable profile, such as square, rectangular, oval, etc. The end surface 112e is configured to abut end surface 106b of the tubular body and may be selectively or fixedly coupled thereto using any suitable means, such as mechanical fasteners, friction fit, adhesives, welding, etc. The opposed end surfaces 112e, 112f define a threaded bore 112g therethrough that is configured to threadably engage a portion of the heim joint 112b.

The heim joint 112b may be any suitable articulating joint and includes an articulating head portion 112h and a threaded shank 112i (FIG. 11) extending therefrom. The threaded shank 112i is configured to threadably engage the threaded bore 112g of the heim joint washer 112a such that the heim joint 112b may translate within the heim joint washer 112a when the heim joint 112b is rotated. In this manner, the overall length of the actuator 102 can be increased or decreased by rotating the heim joint 112b in a first direction or second, opposite direction. The head portion 112h of the heim joint 112b defines a lumen 112j therethrough that is configured to receive a suitable fastener (e.g., bolt, pin, etc.) therein to rotatably couple the heim joint 112b, and thereby the actuator 102, to the actuator mounting flange 42 (FIG. 2) of the base 40.

The heim joint nut 112c is threadably coupled to the threaded shank 112i of the heim joint 112b. The heim joint nut 112c is configured to act as a jam nut such that when the heim joint nut 112c is threaded in a first direction, the heim joint nut 112c abuts the end surface 112f of the heim joint washer 112a, and further rotation of the heim joint nut 112c in the first direction tightens the heim joint nut 112c against the end surface 112f of the heim joint washer 112a to lock the position of the heim joint 112b relative to the heim joint washer 112a. To loosen the heim joint nut 112c, the heim joint nut 112c is rotated in a second, opposite direction.

Although generally described as being a heim joint, it is contemplated that the heim joint 112b may be any suitable articulating joint, and may be integrally formed with the actuator tube 106 or the heim joint washer 112a. In embodiments, the heim joint 112b may be a ball bearing (stainless steel, bronze, brass, polymer, etc.) or a bushing (brass, bronze, polymer, etc.).

In embodiments, the articulation system 100 may not utilize a heim joint assembly 112. Rather, an outer surface 106d of the tubular body 106 defines a transverse bore (not shown) that is configured to receive a suitable fastener (e.g., bolt, pin, etc.) therein to rotatably couple the tubular body 106, and thereby the actuator 102, to the actuator mounting flange 42 of the base 40.

The power screw 110 extends between a first end surface 110a and an opposite, second end surface 110b and defines a threaded outer surface 110c therebetween. The threaded outer surface 110c includes a threadform that is complimentary to that of the nut 108 such that the power screw 110 may threadably engage the threaded bore 108h of the nut 108. In this manner, as the power screw 110 is rotated in a first direction, the overall length of the actuator 102 increases and as the power screw 110 is rotated in a second, opposite direction, the overall length of the actuator 102 decreases. As will be described in further detail hereinbelow, the increase or decrease in the overall length of the actuator 102 causes articulation of the support structure 30 and solar array 20 about the pivot pin 56 of the pivot assembly 50 (FIG. 6).

The threaded outer surface 110c of the power screw 110 may define any suitable threadform (e.g., square, trapezoidal, buttress, etc.) capable of supporting and transmitting large loads, although other threadforms are also contemplated, such as triangular threadforms (e.g., uniform thread standard, etc.). In embodiments, the power screw 110 may be a ball screw, a glidescrew, a leadscrew, etc. In one non-limiting embodiment, the threaded outer surface 110c of the power screw 110 defines a trapezoidal threadform such as an acme threadform and has self-locking or anti-backdrive properties sufficient to inhibit the power screw 110 from rotating under the static weight of the solar array 20, support structure 30, and various components of the articulation system 100 that are supported by the power screw 110. Additionally, the anti-backdrive properties of the power screw 110 inhibit the power screw from rotating when an external force is applied to the solar tracking system 10, such as wind, snow, wildlife, etc. The first end surface 110a is configured to couple to a portion of the gearbox 120 such that a rotational force imparted on the gearbox 120 is transmitted to the power screw 110, as will be described in further detail hereinbelow.

The gearbox 120 includes an outer casing 122 and a gear train 126. The outer casing 122 (FIG. 9) defines a body 128 and a cover 130. The body 128 defines a generally square profile extending between opposed end surfaces 128a and 128b. The end surface 128a defines a cavity 128c therein terminating at an inner surface 128d. The inner surface 128d and the opposed end surface 128b define a through-bore 128e therethrough that is configured to receive a portion of the power screw 110 therein. As will be described in further detail hereinbelow, the through-bore 128e is dimensioned to permit articulation of the power screw 110 relative to the body 122 without causing interference (e.g., the power screw 110 is permitted to pivot relative to the body 122).

The body 128 defines a first pair of opposed side surfaces 128k and 128f and a second pair of opposed side surfaces 128g and 128h disposed transverse to the first pair of opposed side surfaces 128k, 128f. Each of the side surfaces of the first pair of opposed side surfaces 128k, 128f define a through-hole 128i therethrough that is configured to rotatably support a portion of an input shaft 132 therethrough and each of the side surfaces of the second pair of opposed side surfaces 128g, 128h defines a bore 128j (FIG. 9) therethrough that is configured to support a portion of an idler shaft 134 therein, as will be described in further detail hereinbelow. The cover 130 is configured to selectively couple to the end surface 128a using any suitable means, such as mechanical fasteners, adhesives, friction fit, etc.

The gear train 126 includes an input shaft 132, an idler shaft 134, a pair of support bushings 136, a drive gear 138, an idler gear 140, a driven gear 142, and a yoke 144. The input shaft 132 defines a generally cylindrical profile extending between a first end portion 132a and an opposite second end portion 132b. An outer surface 132c of the input shaft 132 defines a hole 132d adjacent each of the first and second end portions 132a, 134b that is configured to selectively receive a pin (not shown) or other suitable device capable of rotatably supporting and longitudinally fixing a drive shaft 150 (FIG. 7) of the solar tracking system 10, as will be described in further detail hereinbelow. The input shaft 132 is configured to be rotatably supported within the through-hole 128i of the first pair of opposed side surfaces 128e, 128f using any suitable means, such as a bushing, bearing, etc.

The idler shaft 134 defines a generally cylindrical profile extending between opposed end portions 134a and 134b. An outer surface 134c of the idler shaft defines a transverse bore 134d therethrough at a center portion thereof (e.g., approximately the middle of the idler shaft 134). The transverse bore 134d extends through the idler shaft 134 perpendicular to an axis A-A defined through the length (e.g., through the opposed end portions 134a, 134b) of the idler shaft 134 and is configured to receive a portion of the input shaft 132 therein. The transverse bore 134d is dimensioned such that the input shaft 132 may rotate about the axis A-A approximately 10 degrees in either direction (e.g., ±10°) without the input shaft 132 impacting any portion of the transverse bore 134d (e.g., the transverse bore 134d includes an inner dimension that is larger than an outer dimension of the input shaft 132), as will be described in further detail hereinbelow.

The pair of support bushings 136 defines a generally cylindrical profile extending between a first end surface 136a and a second, opposite end surface 136b. Each bushing of the pair of support bushings 136 is substantially similar, and therefore, only one support bushing 136 will be described in detail herein in the interest of brevity. The first end surface 136a defines an annular relief 136c extending through an outer surface of the support bushing 136 and extending towards the second end surface 136b. The annular relief 136c terminates at an annular face 136d having an outer dimension that is greater than the outer dimension of the annular relief. The second end surface 136b defines a first counterbore 136e therein extending towards the first end surface 136a and terminating at an annular face 136f. The annular face 136f of the first counterbore 136e defines a boss 136g extending therefrom and protruding past the second end surface 136b and terminating at a third end surface 136h. An outer surface of the boss 136g is configured to be received within the through-hole 128i of the outer casing 122 such that the outer casing 122 is rotatably supported thereon. The third end surface 136h and the first end surface 136a of the support bushing 136 define a through-bore (not shown) therethrough that is configured to rotatably support a portion of the input shaft 132 therein. The first end surface 136a defines a second counterbore 136j therein.

Although generally described as being a one-piece bushing (e.g., a single component), it is contemplated that the support bushing 136 may be formed from more than one component and in one non-limiting embodiment, may be a bearing with a bushing, a bearing with an extended inner race (e.g., roller bearing, ball bearing, etc.), etc. As can be appreciated, the annular face 136d of the support bushing 136 is configured to abut a portion of a respective shear plate 38 of the support structure 30 to inhibit the support bushing 136 from entirely passing through a hole 38c of the shear plate 38. In this manner, the annular face 136d locates the support bushing 136 relative to the gearbox 134.

The yoke 144 defines a generally U-shaped profile having a planar surface 146 and opposed tabs 148 extending therefrom (FIG. 7). Although generally illustrated as having a triangular profile, it is contemplated that the opposed tabs 148 may include any suitable profile, and each tab may be the same or include different profiles. The planar surface 146 defines a bore (not shown) therethrough configured to receive a portion of the power screw 110 therein. It is contemplated that the bore may include a suitable bearing, bushing, etc. (not shown) or in embodiments, may not include a bearing or bushing but rather at least one thrust bearing or bushing (not shown) may be disposed adjacent the planar surface 146 and concentric to the bore. The opposed tabs 148 define a through-hole (not shown) therethrough that is configured to support a portion of the idler shaft 134 therein. In embodiments, the through-hole is dimensioned to fixedly retain the idler shaft 134 therein, such that the idler shaft 134 is inhibited from rotating about the axis A-A, although it is contemplated that the idler shaft 134 may freely rotate within the through-hole of the opposed tabs 148. Where the idler shaft 134 is fixedly retained within the through-hole, it is contemplated that the idler shaft 134 maybe fixedly retained using any suitable means, such as friction fit, keys, splines, adhesives, etc. Each of the opposed tabs 148 defines a boss 148a thereon that is concentric with the through-hole. Each boss of pair of bosses 148a is configured to be received within a respective the bore 128j of the outer casing 122 of gearbox 128 such that each bore 128j rotatably supports each respective boss 148a to enable the yoke 144 to rotate about an axis defined by the idler shaft 134.

The drive gear 138 is supported on the input shaft 132 and is coupled thereto using any suitable means, such as a clamp, friction fit, pins, etc., such that rotation of the input shaft 132 causes a corresponding rotation of the drive gear 138. Although generally shown as a bevel gear, it is contemplated that the drive gear 138 may be any suitable device capable of transmitting rotational motion from the input shaft 132 to the idler gear 140, and in one non-limiting embodiment, the drive gear 138 may be a face-gear or the like.

The idler gear 140 is rotatably supported on the idler shaft 134 such that the idler gear 140 is free to rotate relative to the idler shaft 134 using any suitable means, such as a bushing, bearing, etc. The idler gear 140 is sized and dimensioned such that a portion of the idler gear 140 is able to mesh with the drive gear 138 and a portion of the idler gear 140 is able to mesh with the driven gear 142. Although generally illustrated as being a bevel gear, it is contemplated that the idler gear 140 may be any suitable device capable of transmitting rotational motion from the drive gear 138 to the driven gear 142.

The driven gear 142 is fixedly retained on a portion of the power screw 110 adjacent the first end surface 110a thereof using any suitable means, such as a clamp, friction fit, pins, etc., such that rotation of the driven gear 142 causes a corresponding rotation of the power screw 110. Although generally illustrated as being a bevel gear, it is contemplated that the driven gear 142 may be any suitable device capable of transmitting rotational motion from the idler gear 140 to the power screw 110. As can be appreciated, the driven gear 142 clamps the power screw 110 to the yoke 144 such that the power screw 110, and thus the driven gear 142, is inhibited from translating relative to the yoke 144.

In embodiments, it is contemplated that the location of each of the drive gear 138, the idler gear 140, the driven gear 142, the pair of support bushings 136, and idler shaft 134 may be translatably fixed using circlips, e-clips, pins, adhesives, welding, etc. In this manner, the relative location of each of the drive gear 138, idler gear 140, driven gear, the pair of support bushings 136, and idler shaft 134 may be fixed relative to one another to ensure proper engagement of each of the drive gear 138, the idler gear 140, and the driven gear 142 during operation of the articulation system 100. In embodiments, it is contemplated that any of the drive gear 138, idler gear 140, and driven gear 142 may be a face gear or the like.

It is contemplated that the gearbox 120 may not include a yoke 144, and rather the idler shaft 134 may be supported by the body 128 of the gearbox 120. In this manner, the body 128 of the gearbox supports the upper portion of the power screw 110, and the driven gear 142 clamps the power screw 110 to the body 128.

Returning to FIG. 3, the solar tracking system 10 includes an articulation system 100 disposed at each base 40, although it is contemplated that the solar tracking system 10 may include only one articulation system 100, an articulation system 100 may be disposed at every other base 40, or any other suitable pattern depending upon the installation needs of the solar tracking system 10. The placement of an articulation system 100 at each base 40 reduces the load each articulation system 100 is required to support. As a consequence, the overall size of the components of the articulation system 100 can be reduced, thereby saving materials and cost. Additionally, using multiple articulation systems 100 increases the overall stiffness of the solar tracking system 10 by reducing the distance between each point at which an articulation system 100 is placed, thereby reducing the torsional loading on the support structure 30, amongst other benefits. Further, using multiple actuation systems 100 reduces the need for the pivot pin 56 of the support structure 30 to be placed at the center of gravity of the support structure 30 and solar array 20 assemblies.

Figure 15:
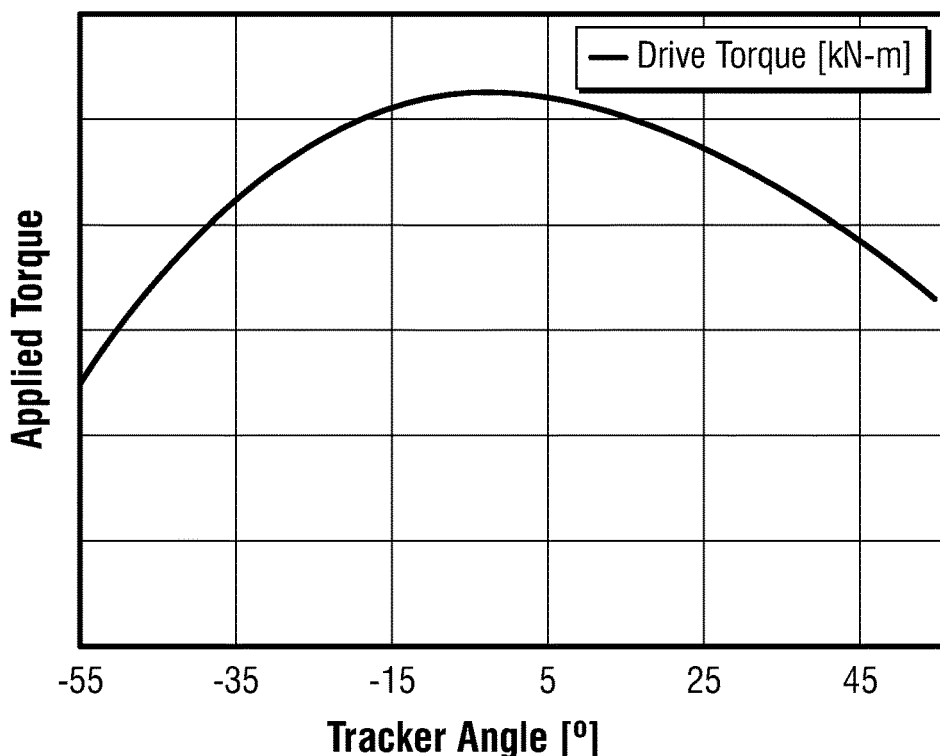
FIG. 15 is a graphical representation of the drive torque required to articulate a solar array of the solar tracking system of FIG. 1 through a range of motion.

As illustrated in FIG. 15, placement of the pivot pin 56 at the geometric center of rotation of the solar array 20 and support structure 30 assembly may cause an unbalanced load as the support structure 30 is articulated by the actuation assemblies 100. Specifically, when in an initial, east facing orientation, the amount of drive torque required to rotate the support structure 30 about the pivot pin 56 is relatively low. However, as the support structure is further rotated, the torque required to rotate the support structure 30 increases until the support structure 30 is placed in an approximately horizontal orientation. Continued rotation of the support structure 30 towards the west requires a diminishing amount of torque as the center of gravity of the solar array 20 and support structure 30 assembly migrates closer to the geometric center of rotation.

To diminish the effects of this unbalanced load, it is contemplated that the pivot pin 56 may be disposed at the center of mass of the solar array 20 and support structure 30 assembly rather than the geometric center of rotation. In this manner, the mass of the solar array 20 and support structure 30 is balanced about the pivot pin 56 and the torque required to articulate the support structure 30 about the pivot pin 56 remains substantially consistent, with little to no variation in the torque required to articulate the support structure through its range of motion. As such, the amount of energy required to articulate the support structure 30 is reduced and the various components required to support the solar array 20 may be substantially similar (e.g., no need to design certain components to take a larger load than others), thereby reducing design time and reducing the number of differing components in the solar tracking assembly 10. As can be appreciated, each solar array 20 may include a differing amount of wiring, actuation systems 100, drive shafts 150, etc. which necessarily means that each solar array 20 may include a different weight than one another. By shifting the axis of rotation from the geometric center of rotation to the center of mass, each solar array may include a different axis of rotation, which in turn, reduces unbalanced loads placed upon the articulation system 100.

Figure 4A:
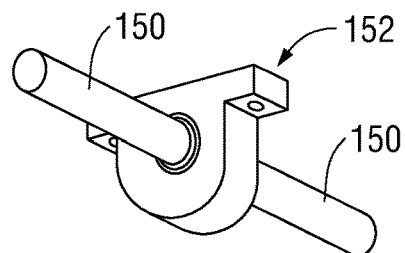
FIG. 4A is an enlarged view of the area of detail indicated in FIG. 4.
Figure 5:
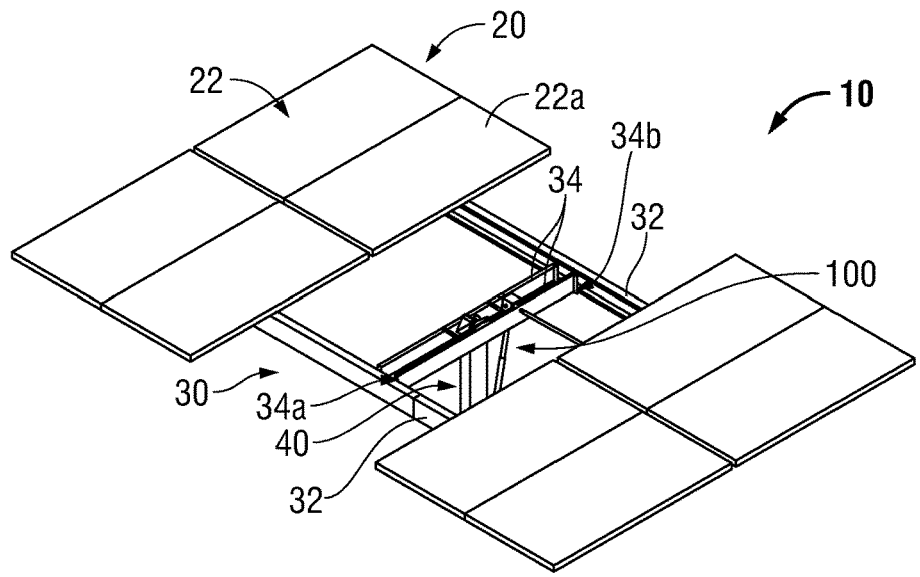
FIG. 5 is a top, perspective view of an articulation system of the solar tracking system of FIG. 1.

In order to transfer the torque between each articulation system 100, a plurality of drive shafts 150 (FIGS. 3, 4A, 6, and 7) are disposed on the support structure 30 and coupled to a respective input shaft 134 of a respective gearbox 120. By locating the plurality of drive shafts 150 on the support structure 30, each base 40 may remain identical, thereby reducing the number of variations of the base 40 required to construct the solar tracking system 10. It is contemplated that each of the plurality of drive shafts 150 may be rotatably supported by a bracket 152 (FIG. 4A), such as a pillow block, heim joint, bushing, etc., that is disposed on the bottom surface 22b of the photovoltaic modules 22 or the frame (not shown) of the photovoltaic modules 22. The outer dimension of the drive shaft 150 and the number of brackets 152 may vary depending on the installation needs of the solar tracking system 10. As can be appreciated, the larger the outer dimension of the drive shaft 150 and a greater number of brackets 152 increases the torsional load capacity of the drive shaft 150 while minimizing wind-up or twist in the drive shaft and reducing the proclivity of the drive shaft 150 to buckle under torsional load.

The bracket 152 inhibits buckling of the drive shaft 150 over its length, and therefore, enables a reduction in the overall diameter and wall thickness of the drive shaft 150 required to transfer a particular load without wind-up or buckling. In this manner, it is contemplated that one or more brackets 152 may be utilized. In one non-limiting embodiment, two brackets 152 are utilized to support the drive shaft 150 at intervals of one third of the overall length of the drive shaft 150.

During fluctuations in temperature, the overall length of each solar array 20 may increase or decrease due to thermal expansion or contraction of the various components thereof. As can be appreciated, the location at which the gearbox 120 secures to the driveshaft 150 may vary due to the dimensional changes driven by thermal expansion or contraction of the driveshaft and/or support structure 30. To accommodate this fluctuation, the yoke 144 is rotatably supported within the outer casing 122 of the gearbox 120 about the longitudinal axis A-A. As such, as the support structure 30 expands and contracts and the gearbox 120 is caused to translate transverse to the actuator mounting flange 42 of the base 40, the actuator 102, via the heim joint 112b, is permitted to rotate about the fastener coupling the heim joint 112b to the mounting flange 42. The transverse bore 134d of the idler shaft 134 provides clearance for the input shaft 132 to pass therethrough without interference as the yoke 144, and therefore the idler shaft 134, rotates about the axis A-A.

Further, the support bushings 38 inhibit the outer casing 122 of the gearbox 120 from rotating relative to the driveshaft 150 to inhibit binding or misalignment between the input shaft 132 of the gearbox 120 and the driveshaft 150.

With reference again to FIG. 4, the articulation system 100 includes a motor 160 and an associated motor gear box 162. The motor 160 may be any suitable motor capable of transmitting rotational motion to the drive shaft 150, such as an alternating current (AC) motor, a direct current (DC) motor, a servo, a stepper motor, etc. In one non-limiting embodiment, the motor 160 is a brushless direct current (DC) motor. The motor 160 is coupled to the gear box 162 using any suitable means, such as mechanical fasteners, adhesives, welding, etc. In turn, the gear box 162 is coupled to the support structure 30 using any suitable means, such as mechanical fasteners, adhesives, welding, etc. It is contemplated that the gear box 162 may be any suitable gearbox capable of transmitting rotational motion from the motor 160 to the drive shaft 150, such as a constant mesh gear box, belts and pulleys, sprockets and chains, friction wheels, hydraulic, etc.

Continuing with FIG. 4, it is contemplated that each articulation system 100 may include a respective motor 160 and gear box 162, or in embodiments, only one motor 160 and gearbox 162 may be utilized. In this manner, a motor 160 and/or gearbox 162 may be placed at any base 40 (regardless of the presence of an articulation system 100) and the rotational torque supplied by the motor 160 will be transferred to each articulation system 100 via the plurality of drive shafts 150. In one non-limiting embodiment, the motor 160 and gearbox 162 may be placed at an outer-most base 40. In embodiments, the motor 160 may be placed at any base 40 and may directly drive the plurality of drive shafts 150 without the use of the gearbox 162. As can be appreciated, utilizing multiple motors 160 reduces the size of the motor required to produce the appropriate amount of torque to articulate the support structure 30. Similarly, utilizing a gear box 162 reduces the size of the motor 160 required to produce the appropriate amount of torque to articulate the support structure 30. Further still, utilizing multiple motors 160 enables smaller and lighter drive shafts 150 to be utilized and reduces the number of brackets 152 that are required to inhibit buckling of the drive shafts 150, and in embodiments, may eliminate the need for the drive shafts 150 altogether.

In embodiments, each actuation system 100 may include a positive stop (not shown) or other similar device capable of inhibiting over extension thereof and to limit any damaged caused therefrom. As can be appreciated, the positive stop for each individual actuation system 100 may be calibrated to inhibit actuation of any one actuation system 100 relative to one another to a certain degree to minimize torsional loads and/or misalignment between adjacent solar arrays 20.

Referring again to FIGS. 1-13, a method of articulating a solar tracking system 10 is described. Initially, each actuation system 100 is calibrated to ensure that the position of each actuator 102 of the solar tracking system 10 is substantially the same. Placing each actuator 102 in the substantially same position reduces the amount of twist of the solar array 20. In embodiments, each actuation assembly 100 may include a positive stop to ensure the actuator 102 does not over extend and damage components of the solar tracking system 10.

After identifying the position of the sun, a signal is transmitted from a suitable controller to the motor or motors 160 to rotate the power screw 110. If the sun is traveling in an east to west direction (e.g., daylight into twilight), the signal causes the motor 160 to rotate in a first direction, thereby causing the power screw 110 to rotate in a corresponding first direction to increase the overall length of the actuator 102. Increasing the length of the actuator 102 causes the support structure 30 to rotate clockwise about the pivot pin 56 and cause the solar array 20 to rotate in a corresponding clockwise direction. To set the position of the solar array 20, the signal causes the motor 160 to rotate in a second direction, opposite to the first direction, thereby causes the power screw 110 to rotate in a corresponding second direction that is opposite to the first direction to decrease the overall length of the actuator 102.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A method of articulating a solar tracking system, comprising:
   identifying a position of the sun relative to a solar array disposed on a support structure, the support structure rotatably supported by a plurality of bases; and
   changing a length of a plurality of actuators associated with the plurality of bases to rotate the solar array relative to the plurality of bases, wherein rotation of the solar array corrects the orientation of the solar array relative to the sun,
   wherein changing the length of the plurality of actuators includes causing a plurality of motors coupled to a respective plurality of gearboxes associated with the plurality of actuators to rotate, wherein rotation of the plurality of motors causes each respective gearbox to change the length of each respective actuator of the plurality of actuators,
   wherein accommodating thermal expansion of the plurality of driveshafts comprises permitting a yoke associated with the gearbox to rotate in a direction along an axis defined by the plurality of driveshafts, and
   wherein accommodating thermal expansion of the plurality of drive shafts includes the gearbox including an input shaft and an idler shaft, an outer surface of the idler shaft defining a transverse bore configured to receive a portion of the input shaft therethrough such that the yoke and idler shaft may rotate relative to the input shaft in the direction along the axis defined by the plurality of driveshafts.

2. The method according to claim 1, wherein changing the length of the plurality of actuators includes causing a motor mechanically coupled to a gearbox associated with the plurality of actuators to rotate, wherein rotation of the motor causes the gearbox to change the length of the plurality of actuators.

3. The method according to claim 1, wherein changing the length of the plurality of actuators includes causing a motor coupled to a plurality of driveshafts to cause a plurality of gearboxes associated with a respective actuator of the plurality of actuators to rotate, wherein rotation of the motor causes the plurality of driveshafts to rotate, which in turn, causes the plurality of gearboxes to change the length of the plurality of actuators.

4. The method according to claim 2, wherein rotation of the motor causes the gearbox to change the length of each actuator of the plurality of actuators in unison.

5. The method according to claim 3, wherein rotation of the motor causes the plurality of driveshafts to rotate, which in turn, causes the plurality of gearboxes to change the length of each actuator of the plurality of actuators in unison.

6. A method of articulating a solar tracking system, comprising:
identifying a position of the sun relative to a solar array disposed on a support structure, the support structure rotatably supported on a base, the base received between a pair of transverse beams of the support structure, the transverse beams oriented substantially perpendicular to a length of the solar tracking system; and
rotating a driveshaft mounted in the support structure and traversing the transverse beams of the support structure, wherein rotation of the driveshaft causes a gearbox coupled between the pair of transverse beams to change a length of an actuator and rotate the solar array relative to the plurality of bases to correct the orientation of the solar array relative to the sun.

7. The method according to claim 6, wherein rotating the driveshaft includes changing the length of the actuator having a first end portion rotatably coupled to the base and a second end portion operably coupled to the gearbox.

8. The method according to claim 6, wherein rotating the driveshaft includes actuating a motor mechanically coupled to the gearbox via the drive shaft.

9. The method according to claim 6, wherein rotating the driveshaft includes causing a plurality of gearboxes associated with a plurality of bases to change a length of a respective actuator of a plurality of actuators.

10. The method according to claim 6, wherein rotating the driveshaft includes causing a plurality of gearboxes associated with a plurality of bases to change a length of a respective actuator of a plurality of actuators in unison.

11. The method according to claim 6, further including accommodating thermal expansion of the driveshaft by permitting a yoke associated with the gearbox to rotate in a direction along an axis defined by the driveshaft.

12. The method according to claim 11, wherein accommodating thermal expansion of the drive shaft includes the gearbox including an input shaft and an idler shaft, an outer surface of the idler shaft defining a transverse bore configured to receive a portion of the input shaft therethrough such that the yoke and idler shaft may rotate relative to the input shaft in the direction along the axis defined by the driveshaft.

13. A method of articulating a solar tracking system, comprising:
identifying a position of the sun relative to a solar array disposed on a support structure, the support structure rotatably supported on a base, the base received between a pair of transverse beams of the support structure, the transverse beams oriented substantially perpendicular to a length of the solar tracking system; and
rotating a driveshaft mounted in the support structure and traversing the transverse beams of the support structure, wherein rotation of the driveshaft effectuates a change in length of an actuator having a first end portion rotatably coupled to the base and a second end portion operably coupled to the support structure, wherein changing a length of the actuator causes rotation of the solar array relative to the plurality of bases to correct the orientation of the solar array relative to the sun.

14. The method according to claim 13, wherein rotating the driveshaft includes effectuating a change in length of the actuator via a gearbox rotatably supported by a support bushing coupled to the support structure, the support bushing enabling the gearbox to rotate axially within the support bushing but inhibit axial translation of the gearbox relative to the support bushing.

15. The method according to claim 13, further including accommodating thermal expansion of the driveshaft by permitting a yoke to rotate in a direction along an axis defined by the driveshaft.

16. The method according to claim 15, further including accommodating thermal expansion of the driveshaft, wherein the second end portion of the actuator is rotatably coupled to a yoke, the yoke permitting rotation of the actuator in a direction parallel to the driveshaft without causing a corresponding rotation of the gearbox.

17. The method according to claim 13, wherein rotating the driveshaft includes actuating a motor mechanically coupled to driveshaft.

* * * * *